(12) United States Patent
Katayama et al.

(10) Patent No.: US 8,712,225 B2
(45) Date of Patent: Apr. 29, 2014

(54) PLAYBACK DEVICE FOR STEREOSCOPIC VIEWING, INTEGRATED CIRCUIT, AND PROGRAM

(75) Inventors: Tomoko Katayama, Osaka (JP); Germano Leichsenring, Kanagawa (JP); Osamu Yamaji, Osaka (JP)

(73) Assignee: Panasonic Corporation, Osaka (JP)

( * ) Notice: Subject to any disclaimer, the term of this patent is extended or adjusted under 35 U.S.C. 154(b) by 282 days.

(21) Appl. No.: 13/379,501

(22) PCT Filed: May 17, 2011

(86) PCT No.: PCT/JP2011/002730
§ 371 (c)(1),
(2), (4) Date: Dec. 20, 2011

(87) PCT Pub. No.: WO2011/148587
PCT Pub. Date: Dec. 1, 2011

(65) Prior Publication Data
US 2012/0099843 A1 Apr. 26, 2012

(30) Foreign Application Priority Data
May 28, 2010 (JP) .................................. 2010-122216

(51) Int. Cl.
*H04N 5/93* (2006.01)
(52) U.S. Cl.
USPC ........................................................ 386/353
(58) Field of Classification Search
CPC ............. H04N 5/00; H04N 5/76; H04N 9/00; H04N 13/00; H04N 13/003; H04N 13/0018
USPC .......................................... 386/200, 241, 353
See application file for complete search history.

(56) References Cited

U.S. PATENT DOCUMENTS

2007/0236493 A1  10/2007  Horiuchi et al.
2009/0244268 A1  10/2009  Masuda et al.

FOREIGN PATENT DOCUMENTS

| JP | 10-172004 | 6/1998 |
| JP | 11-164328 | 6/1999 |
| JP | 2005-109568 | 4/2005 |
| JP | 2009-239388 | 10/2009 |

OTHER PUBLICATIONS

International Search Report for corresponding International Patent Application No. PCT/JP2011/002730, mailed Aug. 16, 2011.

*Primary Examiner* — Huy T Nguyen
(74) *Attorney, Agent, or Firm* — Greenblum & Bernstein, P.L.C.

(57) ABSTRACT

Ocular strain is reduced for the viewer by reducing extreme changes of depth value occurring at stereoscopic scene jumps, dimension switches from 2D to 3D video, and the like. A playback device includes a video plane and a depth value memory for storing depth values of a plurality of stereoscopic video frames. The depth value memory stores the depth values of a plurality of frames, at least including a destination frame, and of a starting frame. When a request to switch from 2D to 3D video or to switch scenes within 3D video is received, switch timing control or destination frame depth value adjustment is performed so as to reduce the occurrence of extreme depth value changes and provide smooth switching.

11 Claims, 17 Drawing Sheets

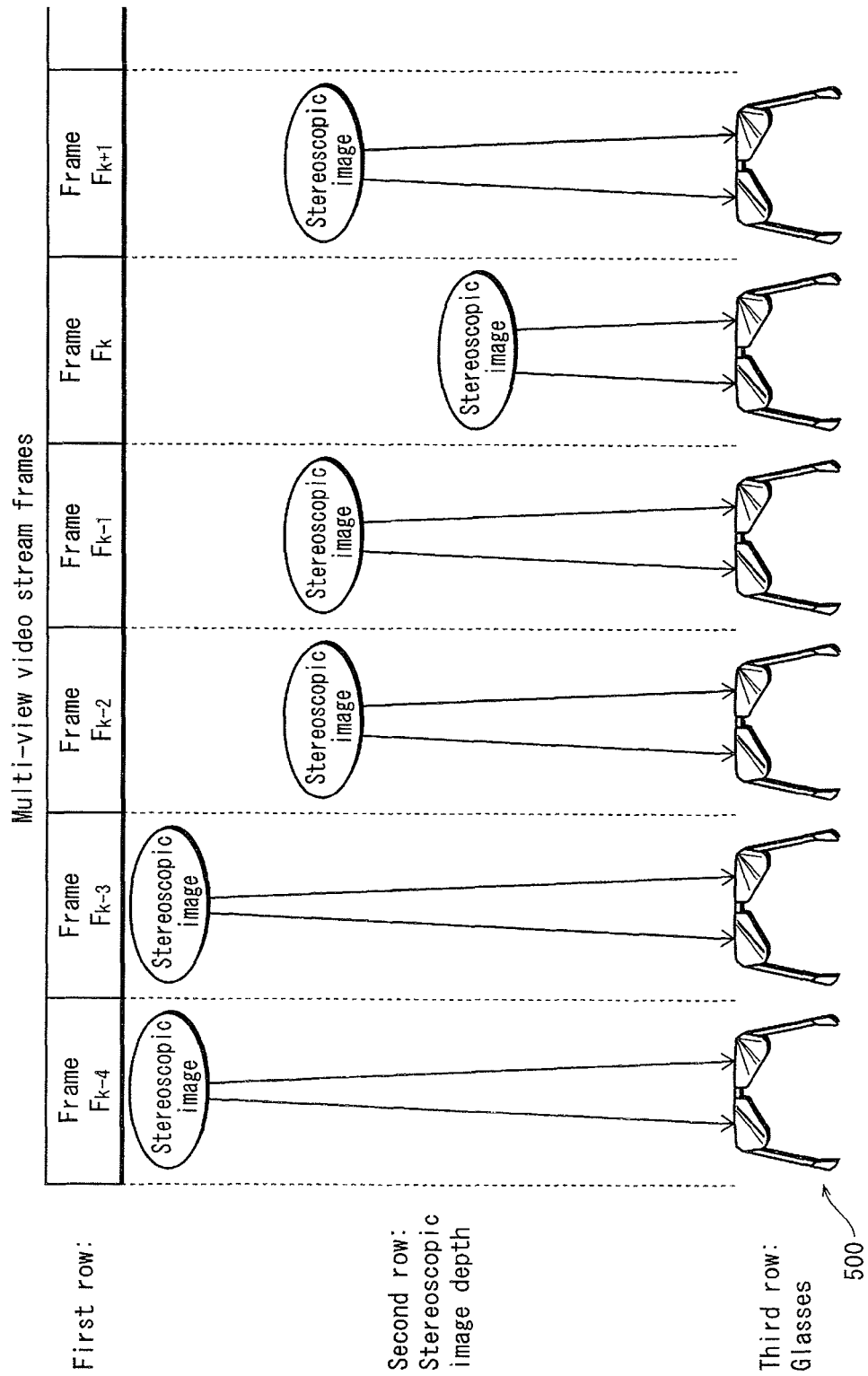

FIG. 10
Current multi-view video stream i
First row: | k-6 | k-5 | k-4 | k-3 | k-2 | k-1 | k | k+1 | k+2 | k+3 | k+4 | k+5 | k+6 | k+7 |
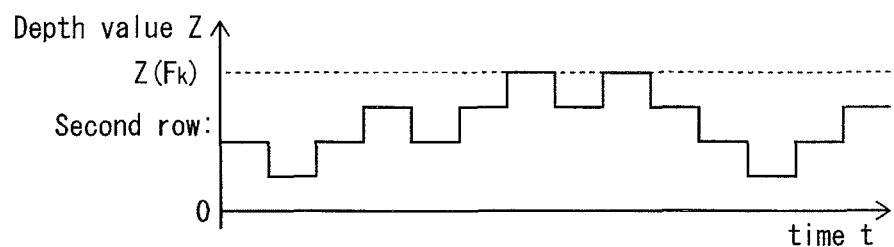
Second row:
Jump destination multi-view video stream j
Third row: | m-6 | m-5 | m-4 | m-3 | m-2 | m-1 | m | m+1 | m+2 | m+3 | m+4 | m+5 | m+6 | m+7 |
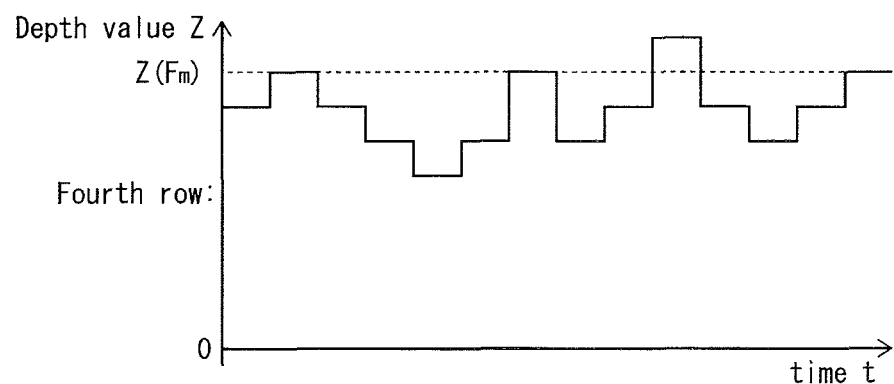
Fourth row:

FIG. 11A
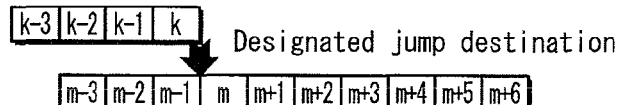
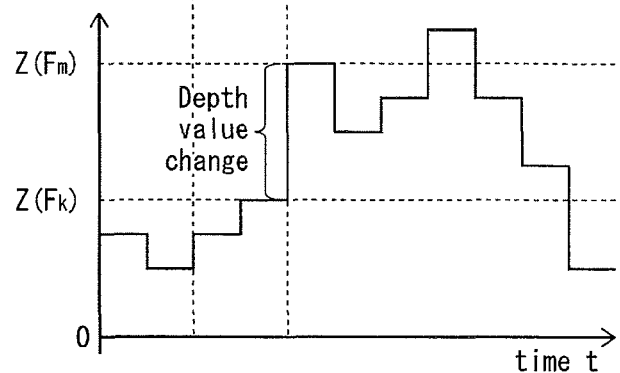
FIG. 11B
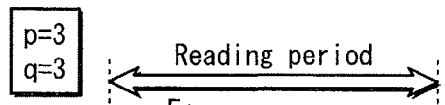
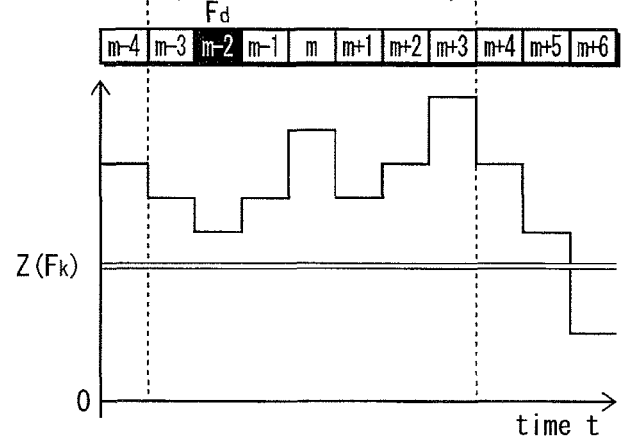
FIG. 11C
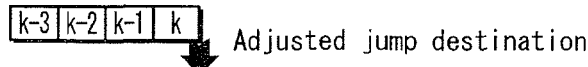
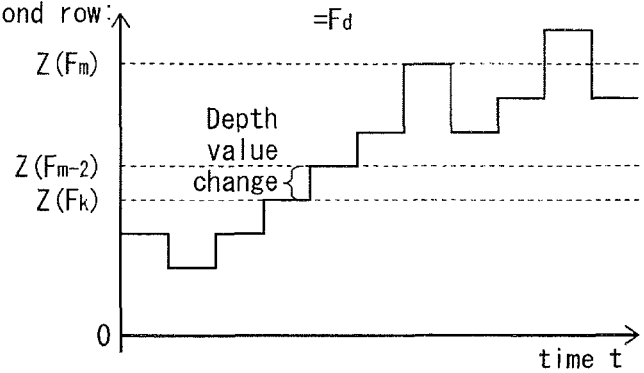

FIG. 13A
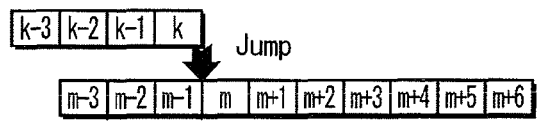
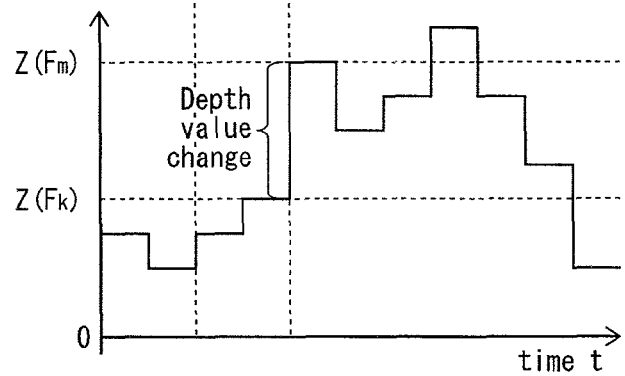
FIG. 13B
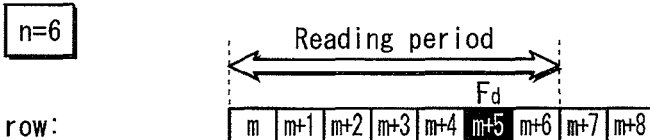
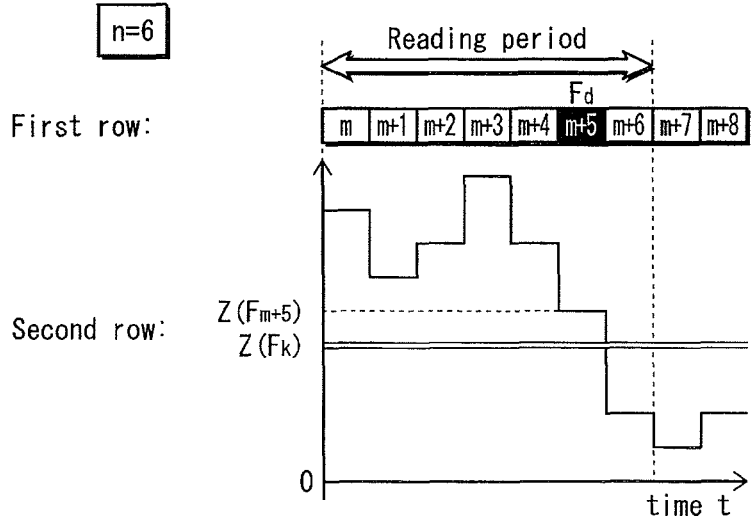
FIG. 13C
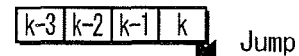
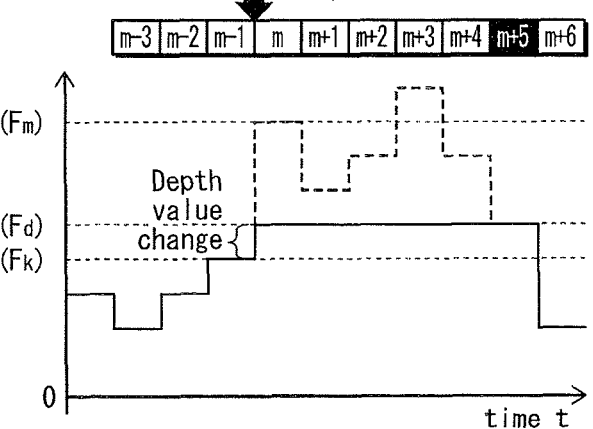

PLAYBACK DEVICE FOR STEREOSCOPIC VIEWING, INTEGRATED CIRCUIT, AND PROGRAM

TECHNICAL FIELD

The present invention pertains to the field of stereoscopic playback using parallax.

BACKGROUND ART

Although various methods of stereoscopic viewing are employed, in recent years, the most common such method has been parallax viewing, which involves showing left-view and right-view images to a viewer so as to create the illusion of stereoscopy through inter-image parallax.

In this form of stereoscopic playback, the depth perceived by the viewer is dependent on the magnitude of the parallax separating the left and right images. As such, the viewer's eyes perform focus adjustment in order to perceive the left and right images stereoscopically.

The angle between the direction of the left eye when viewing a 2D display and the direction of the left eye when viewing a 3D display is termed the parallax angle. The greater the sudden change of parallax angle, the more likely ocular fatigue becomes, as the eye must suddenly change direction to perceive the new angle. Although the parallax angle is defined with respect to the left eye, the same parallax angle is generally also definable with respect to the right eye. The greater the change in parallax angle, the more the eye must move in response to the change. The need to move a greater distance over a short time is a cause of ocular fatigue.

The below-cited publications describe publicly-known inventions of technology for reducing ocular fatigue when viewing 3D video.

The playback device described by Patent Literature 1 does not immediately begin 3D playback upon input of left-view and right-view signals, but instead waits for a predetermined interval to pass before doing so. When performing a switch from 2D to 3D, the playback device reduces ocular fatigue by gradually changing the parallax. The gradual change is one of a monotonic increase, a concave change, or a convex change (see FIG. 4 and paragraph 0015 of Patent Literature 1). During this gradual change, a target parallax is calculated by the parallax calculating means 12 and used, as determined, by the parallax determining means 14 (see paragraph 0008 of Patent Literature 1).

CITATION LIST

Patent Literature

[Patent Literature 1]
Japanese Patent Application Publication No. H11-164328

SUMMARY OF INVENTION

Technical Problem

When 3D video is viewed at home with a television and a playback device, as opposed to a 3D movie viewed in a theatre, the viewer is able to freely switch between 2D mode and 3D mode, and to perform bookmark jumps, chapter jumps and so on. Movie makers ensure that no extreme changes in stereoscopic depth occur within any single video stream making up the movie. However, movie makers cannot guarantee that changes in stereoscopic depth will always be appropriate when the viewer performs switching from 2D mode to 3D mode, or performing bookmark jumps and chapter jumps in 3D mode. As such, unexpected changes in stereoscopic depth, such as these situations, often arise and cause ocular fatigue for the viewer through great changes to the parallax angle.

Warning against switching from 2D mode to 3D mode or against frequent bookmark jumps and chapter jumps while in 3D mode are plausible. However, this weakens the random access function of the playback device in that desired scenes cannot be viewed at will, in turn greatly reducing the appeal of the playback device as a consumer product.

Patent Literature 1 is focused on parallax changes occurring when switching from 2D mode to 3D mode, when performing scene jumps, and so on. According to Patent Literature 1, the parallax change is made smoother in such situations. The gradual change of parallax described in Patent Literature 1 changes a parallax value from 0 to a target parallax value over a plurality of frames. As such, the target parallax value must be fixed.

The parallax calculating means 12 of Patent Literature 1 is able to monitor the parallax of an input signal and use the most recent parallax (see paragraph 0024). However, when the target parallax changes in response to video signal playback progression, the parallax of the frame being played back may come to greatly differ from the target parallax, despite the gradual parallax adjustment, as the former actively changes over the course of playback progression. Under such circumstances, the difference in parallax between that of the target frame and that of the frame being played back for the switch may be very large. There is thus no guarantee that ocular fatigue is always reduced. Indeed, the parallax may be increased.

Gradual parallax adjustment may plausibly be performed by pausing playback and gradually changing the parallax of the paused frame so as to match the target parallax. However, given that the playback process does not progress while paused, the frames of the input signal must be buffered for the duration of the gradual parallax adjustment. Yet, if this duration is long, a buffer overflow may result and cause frames to be dropped. The occurrence of dropped frames makes it impossible to guarantee an appropriate parallax for the frames before and after any drops. Ultimately, the dilemma of large parallax changes remains.

An aim of the present invention is to provide a playback device able to reduce eye strain despite playback position and mode changes being performed by the user at will.

Solution to Problem

As a solution to the above-stated problem, the present invention provides a playback device for outputting 3D video for stereoscopic viewing, comprising: an acquisition unit acquiring a video stream from an external source; a playback unit decoding the video stream so acquired to output 3D video; a state management unit managing a playback state of the playback unit; and an adjustment unit performing adjustment, when a change of playback state occurs, by (i) selecting a depth value reference frame from among a plurality of frames preceding and following a frame at an occurrence time of the change, and (ii) using the depth value reference frame to adjust a depth value of 3D video.

Advantageous Effects of Invention

The phenomena of a switch from 2D mode to 3D mode, a bookmark jump within 3D mode, and a chapter jump within 3D mode are all considered to be changes of playback state for the playback device. Therefore, when a switch from 2D mode to 3D mode, a bookmark jump within 3D mode, or a chapter jump within 3D mode occurs, a depth value reference frame is selected from among a plurality of frames following the occurrence time of the playback state change so that the change in depth value accompanying the state change is restricted to a predetermined range, thus reducing ocular fatigue despite the intensity of the change. This allows 3D playback devices to be operated in the same manner as 2D playback devices. Thus, the eyes are spared from intense strain, regardless of the frequency of switches from 2D mode to 3D mode, bookmark jumps within 3D mode, and chapter jumps within 3D mode.

An appropriate depth is guaranteed by the playback device, regardless of switches from 2D mode to 3D mode, bookmark jumps within 3D mode, and chapter jumps within 3D mode made by the user. Therefore, the merits of switches from 2D mode to 3D mode, bookmark jumps within 3D mode, and chapter jumps within 3D mode are attainable for the creators of movie products, enabling progress in content creation.

BRIEF DESCRIPTION OF DRAWINGS

FIG. 3 illustrates the change in stereoscopic image depth over time.

FIG. 10 illustrates the change in depth value when making a jump.

FIGS. 11A, 11B, and 11C illustrate the depth value adjustment performed for the scene jump to a variable destination frame.

FIGS. 13A, 13B, and 13C illustrate the depth value adjustment performed for the scene jump to a fixed destination frame.

DESCRIPTION OF EMBODIMENTS

The following describes a playback device, an integrated circuit, and a playback method as Embodiments of the present invention, with reference to the accompanying drawings.

The playback device including the solution to the above-described problem is realizable as a player apparatus for playing back a package medium. Similarly, the integrated circuit is realizable as a system LSI integrated in such a player apparatus. The playback method is realizable as a sequential series of steps executed by the player apparatus.

Figure 1:
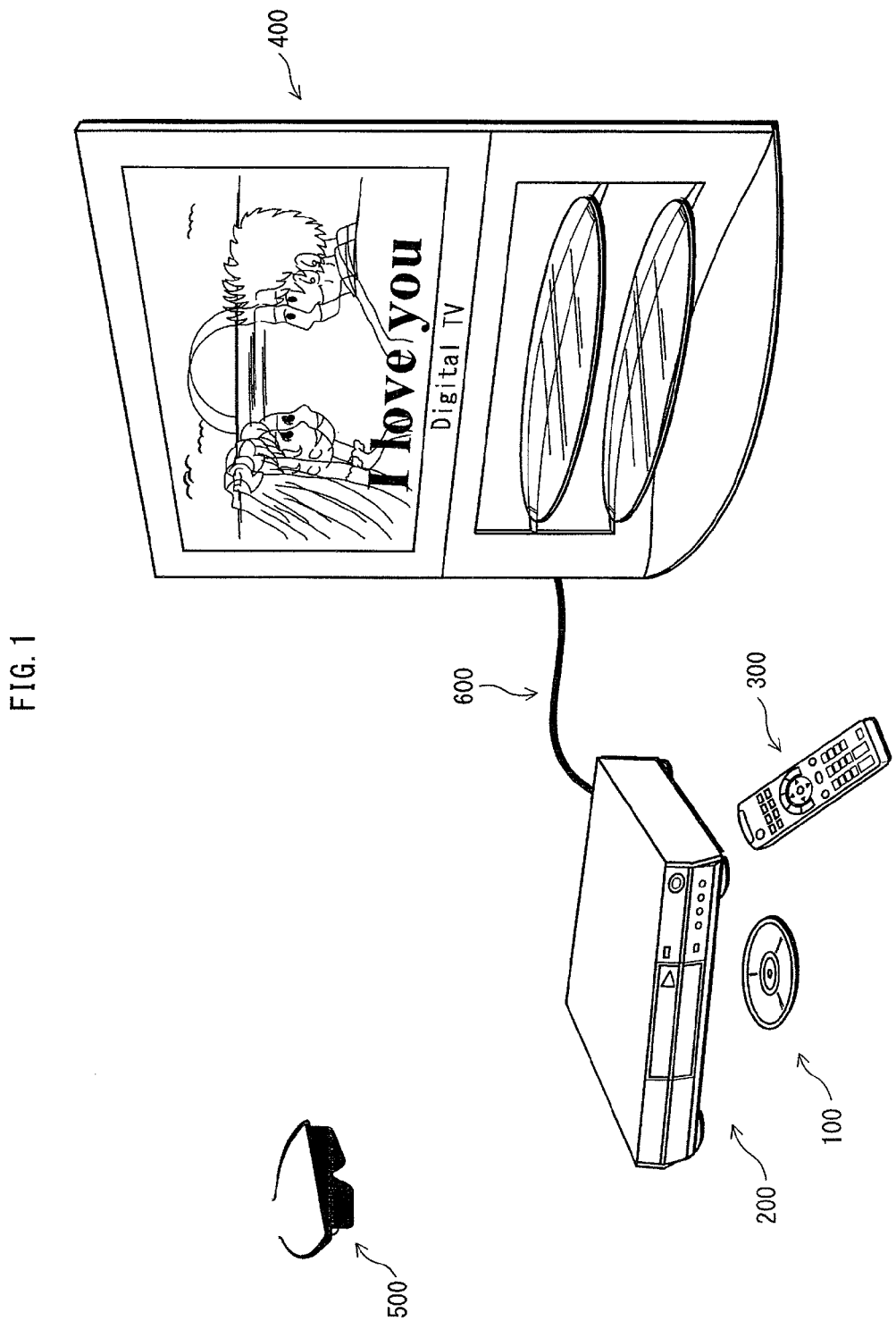
FIG. 1 is an illustration of a home theatre system made up of a recording medium serving as a package medium, a playback device serving as a player apparatus, a display device, and glasses.

FIG. 1 illustrates a home theatre system made up of a recording medium serving as the package medium, the playback device serving as the player apparatus, a display device, and glasses. As shown, the recording medium serving as the package medium, the playback device serving as the player apparatus, the display device, the glasses, and a remote control form the home theatre system, which is provided to and is operable by a user.

A read-only medium 100 for the above-described home theatre system is, for example, an optical disc supplying a video product.

The playback device 200 is connected to the display device 400 to play back the content of the read-only medium 100. This playback involves video output intended for the left eye (left-view video) and video output intended for the right eye (right-view video), repeating in alternation. The video thus played back may be 2D video or 3D video. Given, for example, an X-Y plane that includes the display screen of the display device, 2D video is expressed as pixels at display positions on the display screen, located in the X-Y plane. This is also termed planar video. The playback mode used by the playback device to play back 2D video is interchangeably termed "2D mode" and "planar playback mode".

In contrast, given a Z-axis orthogonally intersecting the above-described X-Y plane, 3D video appears with additional depth along the Z-axis. The playback mode used by the playback device to play back 3D video is interchangeably termed "3D mode" and "stereoscopic playback mode".

The remote control 300 receives commands from the user, made through a hierarchical GUI. In order to receive these commands, the remote control 300 includes a menu key that calls up the GUI menu, arrow keys that move the focus of the GUI elements making up the menu, a confirmation key that causes a certain operation to be performed through the GUI, a return key that backtracks to a higher level of the hierarchical menu, and number keys.

Upon receiving video output from the playback device 200, the display device 400 outputs the left-view pictures and the right-view pictures in alternation, without modification, and at synchronized timing. Timing synchronization is achieved by setting the same framerate for the display alternation and for the video output. In order to reduce the strain on the viewer's eyes, the framerate for display alternation may be multiplied, while leaving the other framerate as-is. In such circumstances, a set made up of a left-view picture and the subsequent right-view picture is loaded by the display device 400, which then achieves high-framerate display by rapidly alternating between the two pictures. The screen of the display device 400 is illustrated as displaying a double image of a man and woman. When the screen of the display device 400 is viewed without wearing the shutter glasses 500, the right-view video and the left-view video intended for 3D mode appear to form a duplicated image.

The shutter glasses 500 include liquid crystal shutters having variable optical transmittance, which is controlled through the application of voltage. By varying the optical transmittance, two functions are realized: (i) allowing light to pass for the left eye while blocking light for the right eye; and (ii) blocking light for the left eye while allowing light to pass for the right eye. Accordingly, the left-view video is shown to the left eye without being visible to the right eye, and the right-view video is shown to the right eye without being visible to the left eye. When stereoscopic video is viewed, the shutter glasses 500 repeatedly alternate between showing images to the viewer's left eye (left-view video) and showing images to the viewer's right eye (right-view video). Thus, the alternation is synchronized as the viewer wears the shutter glasses such that, while left-view video is being displayed, light is allowed to reach the left eye but not the right eye, and while right-view video is being displayed, light is allowed to reach the right eye but not the left eye. Accordingly, the shutter glasses ensure that the left-view video is shown only to the left eye and that the right-view video is shown only to the right eye.

According to such a structure, the left-view video and the right-view video come to form a single video having a certain parallax perceived by the viewer as depth. Thus, the video displayed on the display appears to be stereoscopic video popping out from the display.

A cable 600 transports uncompressed video streams and uncompressed audio streams at a high rate of transfer. The cable 600 may be an HDMI cable or similar.

This concludes the description of the home theatre system. The following describes the details of stereoscopic video.

Figure 2B:
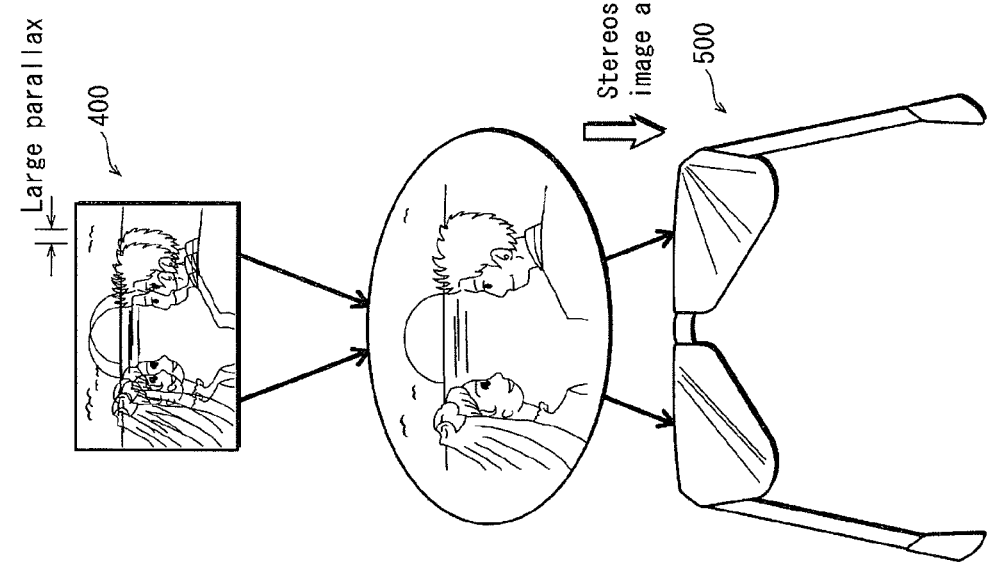
FIGS. 2A and 2B illustrate the depth variance of stereoscopic video as seen through shutter glasses 500.
Figure 2A:
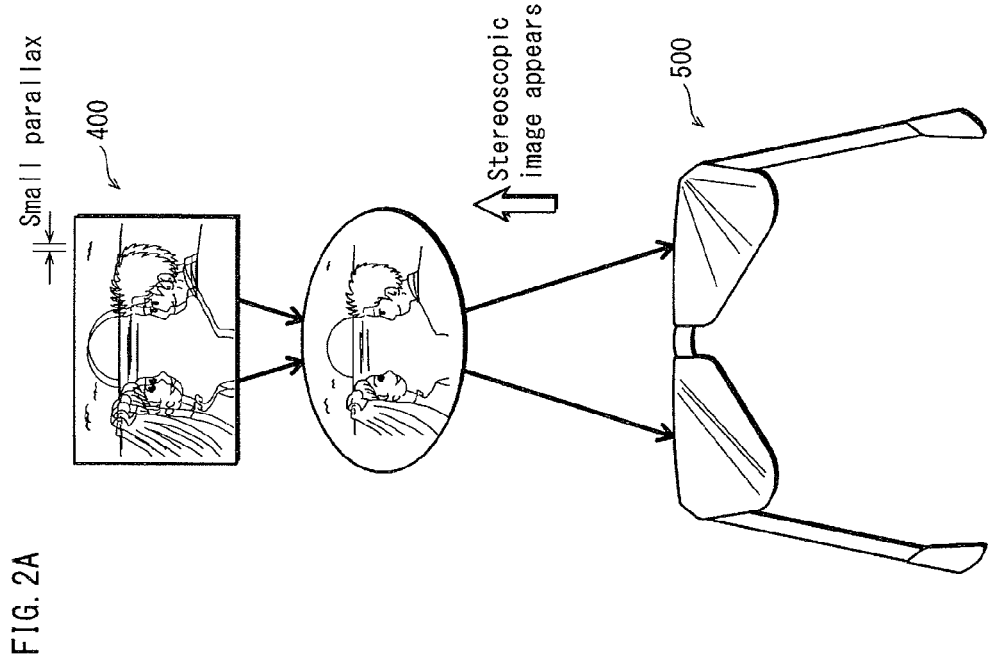

FIGS. 2A and 2B illustrate the depth variance of stereoscopic video as seen through the shutter glasses 500. FIG. 2A illustrates a large-parallax image appearing as stereoscopic video, while FIG. 2B illustrates a small-parallax image similarly appearing as stereoscopic video.

The bottom portion of FIG. 2A represents the image as seen by the viewer, while the top portion represents the image as displayed on the display device 400. The stereoscopic image appears between the display device 400 and the shutter glasses 500. FIGS. 2A and 2B differ in terms of the distance between the stereoscopic image and the display device 400. In FIG. 2A, where the parallax is small, the stereoscopic image appears to be located closer to the display device 400 and farther from the shutter glasses 500. In FIG. 2B, where the parallax is larger, the stereoscopic image appears farther from the display device 400 and closer to the shutter glasses 500. As FIGS. 2A and 2B make apparent, controlling the size of the parallax enables control of the stereoscopic image depth. That is, the stereoscopic image is controlled so as to appear closer to or farther from the shutter glasses 500.

FIG. 3 illustrates the change in stereoscopic image depth over time. The horizontal axis represents the video stream time axis, while the vertical axis represents the spatial distance between the display device 400 and the shutter glasses 500. The video stream time axis along the horizontal axis of FIG. 3 is made up of a plurality of frames. The depth varies, taking on a different value in each frame. The depth is low in frames $F_{k-4}$ and $F_{k-3}$, but high in frame $F_k$.

Figure 4:
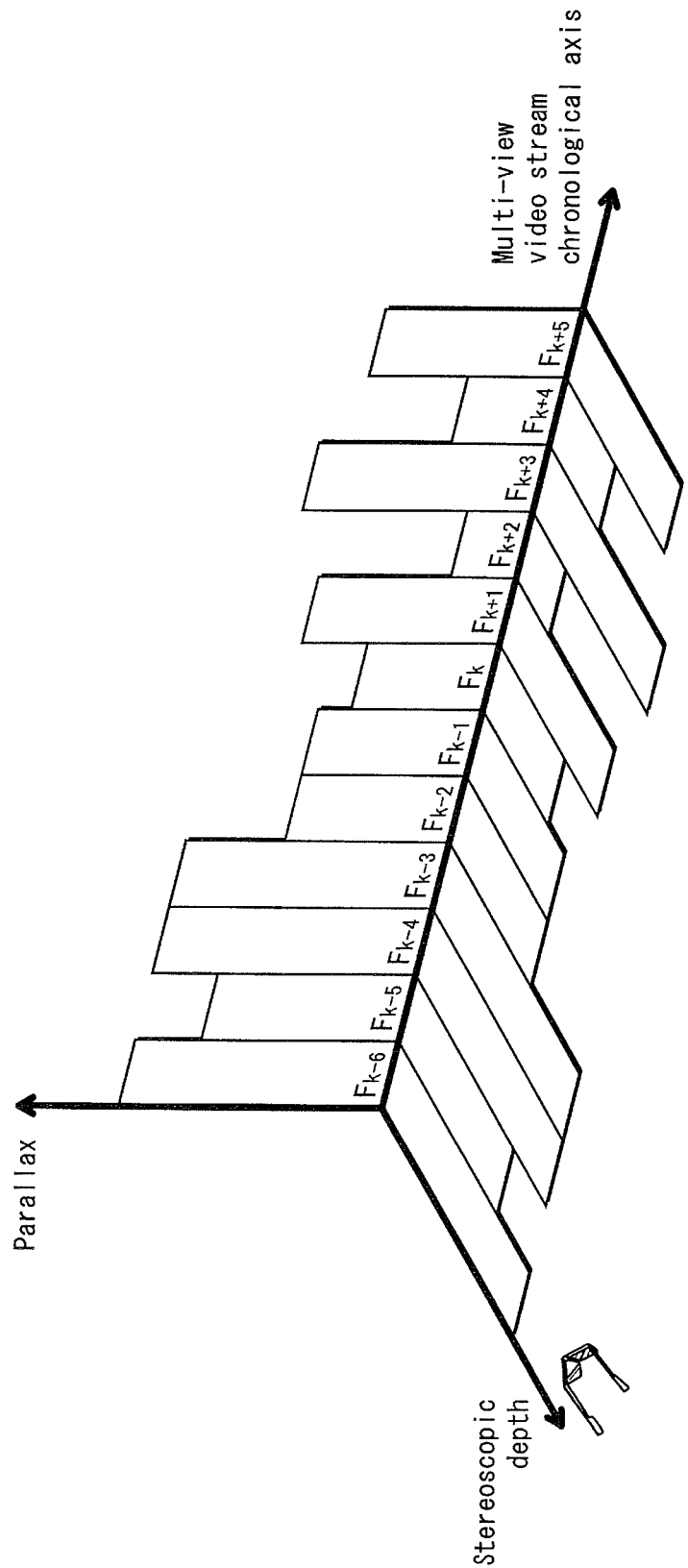
FIG. 4 illustrates the changes, over time, in stereoscopic image depth and in parallax between right-view and left-view video.

FIG. 4 illustrates the change, over time, in stereoscopic image depth and in parallax between the right-view video and the left-view video.

The Y-axis corresponds to the video stream time axis, the X-axis corresponds to the stereoscopic image depth, and the Z-axis corresponds to the parallax. As indicated, there is a clear link between larger parallax and greater image depth. For example, frames $F_{k-4}$ and $F_{k-3}$ have greater depth due to the larger parallax, while frames $F_{k+2}$ and $F_{k+4}$ have lower depth due to the smaller parallax. As FIG. 4 makes apparent, the frame-to-frame difference in parallax has a strong influence on the perceived depth of the stereoscopic video. In discussing depth control, the size of the parallax is hereinafter termed the depth value.

This concludes the explanation of stereoscopic video. The following describes the internal configuration of the playback device 200.

Figure 5:
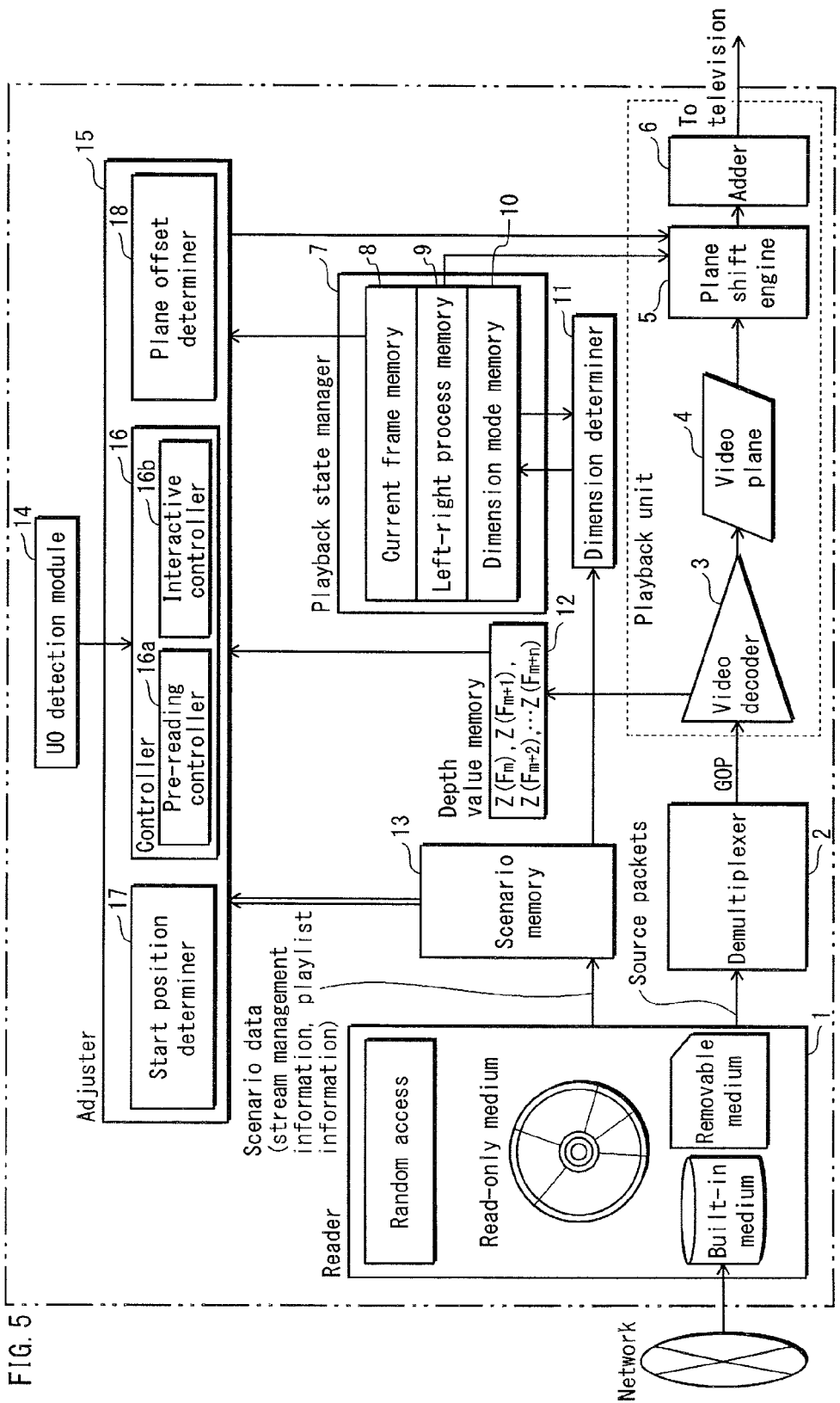
FIG. 5 is a diagram showing the internal configuration of the playback device.

FIG. 5 is a diagram showing the internal configuration of the playback device 200. As shown, the playback device 200 includes a reader 1, a demultiplexer 2, a video decoder 3, a video plane 4, a plane shift engine 5, an adder 6, a playback state manager 7, a current frame memory 8, a left-right process memory 9, a dimension mode memory 10, a dimension determiner 11, a depth value memory 12, a scenario memory 13, a UO detection module 14, an adjuster 15, a controller 16, a start position determiner 17, and a plane offset determiner 18.

Upon insertion of the recording medium on which stereoscopic video content is recorded, the reader 1 performs reading and writing on the recording medium. The recording medium is the read-only medium 100, and may be either of a rewritable removable medium and a rewritable built-in medium. The playback device also includes a random access unit. The random access unit randomly accesses a given point along the time axis of the video stream. The video stream includes a standard video stream and a multi-view video stream. The multi-view video stream is intended for stereoscopic viewing and is made up of a base-view video stream and a dependent-view video stream. Specifically, when instructed to begin playback at a given point along the time axis of the video stream, the random access unit uses an entry map, which is a piece of scenario data, to search for a source packet number of an access unit, which is data corresponding to the given time point. The access unit includes independently decodable picture data, or alternatively includes a set of view components. A view component is a component of stereoscopic video. The set includes one component corresponding to the right-view video and one component corresponding to the left-view video. The search involves specifying a source packet number for the source packet containing an access unit delimiter pertaining to the access unit. The source packet number is read and decoding is executed. When a scene jump occurs, the above-described search is performed using time information that indicates the jump destination to perform the random access.

The demultiplexer 2 demultiplexer streams input thereto and outputs a plurality of different packetized element streams. The element streams so output may include a video stream, a graphics stream intended for subtitles, a graphics stream intended for interactivity, and an audio stream. Among these, the video stream is output from the video decoder 3. The graphics streams intended for subtitles and for interaction are each sent to a corresponding graphics decoder (not diagrammed), while the audio stream is sent to an audio decoder (not diagrammed).

The video decoder 3 decodes the access units making up the video stream extracted by the demultiplexer 2, and writes uncompressed picture data to the video plane 4. While decoding the multi-view video stream, the video decoder 3 fetches supplementary expansion data from the access unit at the head of the sequence within the dependent-view video stream, and then writes the depth value of each frame within the supplementary expansion data to the controller 16.

The video plane 4 is memory able to store one screen of pixel data at a time, each screen being uncompressed picture data obtained by the video decoder 3. The video plane has a dual-plane configuration and a single-plane configuration. In the dual-plane configuration, the video plane 4 includes a left-view video plane and a right-view video plane. The left-view and right-view video planes making up the dual-plane configuration respectively contain the left-view pictures and right-view pictures obtained by decoding the multi-view video stream. In the single-plane configuration, the video plane 4 contains pixel data from uncompressed picture data obtained by decoding the standard video stream.

The plane shift engine 5 performs plane shifting when the video plane 4 is in the single-plane configuration. Once the left-right process memory 9 determines whether the frame $F_c$ currently being processed (hereinafter, current frame $F_c$) is part of the left-view video or the right-view video, the later-described plane offset determiner 18 determines an offset based on the picture stored in the video plane. The offset indicates the extent to which the displayed output video is shifted along the horizontal direction (lateral axis) of the display screen with respect to a reference point. The plane shift engine 5 then shifts each pixel stored in the video plane so as to impart the offset thus determined. Although not diagrammed, a graphics plane for storing uncompressed subtitle graphics and a graphics plane for storing interactive graphics are also included in addition to the video plane 4. The plane shift engine 5 also performs shifting on each pixel stored in each of these graphics planes.

The adder 6 multiplicatively imparts a predetermined transparency to each pixel stored in the video plane 4 and in the graphics planes intended for subtitles and interactivity. This enables the pixels contained in the video plane 4 and in each of the graphics planes to be superimposed. Once addition has been performed on all pixel data in the video plane 4, the layer composition of the video plane 4 and the graphics planes for subtitles and interactivity is complete. Once layer composition has been performed, the pixel data making up the composite picture data is output by the adder 6 for display. Taken together, the above-described video decoder 3, the video plane 4, the plane shift engine 5, and the adder 6 form a playback unit.

The playback state manager 7 includes the current frame memory 8, the left-right process memory 9, and the dimension mode memory 10, and manages the playback state of the above-described playback unit.

The current frame memory 8 is made up of a plurality of playback state registers registering parameters that specify the current frame $F_c$ currently being processed. The parameters that specify the current frame $F_c$ include a current title number, a current playlist number, a current play item number, a current chapter number, a current bookmark number, a current angle number, and a current presentation time (PTM).

Here, the current title number indicates the title currently undergoing playback, among a plurality of titles listed in an index table of the read-only medium 100.

The current playlist number is the playlist currently undergoing playback, among playlist information (defining a playback path made up of a main path and sub-paths) listed on the read-only medium.

The current play item number indicates the play item currently undergoing playback, among a plurality of play items (a playback interval defined by a pair of an In_time and an Out_time along the time axis of the video stream) making up the playlist corresponding to the current playlist number.

The current chapter number indicates the chapter currently selected, among a plurality of chapters defined by the play item information making up the playlist information. Here, the playlist information includes playlist mark information. The playlist mark information indicates a mark pertaining to the play item information, made up of play item information and a time stamp. Each chapter defined by the playlist information is specified by mark information in the playlist. Given that the playlist information always specifies chapters through playlist mark information, when the video stream is being played back through the playlist, one of these chapters must be specified as the current chapter number. The current chapter number is updated as video stream playback progresses.

The current bookmark number is the number of the currently selected bookmark, among a plurality of bookmarks defined by the play item information of the playlist. These bookmarks differ from the chapters in that, while the chapters are defined at authoring time, the bookmarks are set by user operations.

The playback device receives a marking operation made by the user at a screen and specifies a bookmark by internally generating playlist mark information as described above. Once a plurality of bookmarks have been set by such operations, one of the bookmarks is specified as the current bookmark number when the playlist is played back. The current bookmark number is updated as video stream playback progresses. The parameters stored in the current frame memory 8, i.e., the current play item number, the current chapter number, and the current bookmark number are updated to execute scene jumps.

Let the play item information include two or more sets of stream reference information, each having angle reference information allowing a video stream at a different camera angle to be referenced. The current angle number thus indicates the current video stream, among the video streams at different camera angles. The current angle number is not updated when the stream reference information is the only such information within the play item information. The stream reference information is updated only when two or more pieces of such information are found within the play item information.

The current PTM indicates the current presentation time stamp along the time axis of the video stream as referenced by the current play item information corresponding to the current play item number. The current PTM is expressed to the same precision as the clock. The current PTM is updated as decoding of the video stream by the video decoder progresses.

Changes to any of the current title number, the current playlist number, the current play item number, the current chapter number, the current bookmark number, and the current angle constitute changes to the playback state. However, updating the current PTM does not, by itself, constitute a change to the playback state. As described above, the current PTM continually changes as playback progresses.

The left-right process memory 9 stores information indicating whether the frame currently undergoing processing, among the frames making up the video stream, belongs to the left-view video or to the right-view video.

The dimension mode memory 10 stores a current mode number indicating whether the video being output is in 2D or in 3D. The current mode number stored in the dimension mode memory 10 is overwritten by a new number whenever a switch occurs from 2D mode to 3D mode or from 3D mode to 2D mode. This concludes the explanation of the current frame memory 8, the left-right process memory 9, and the dimension mode memory 10 included in the playback state manager 7. The details of the dimension determiner 11 are described below.

The dimension determiner 11 uses mode-setting parameters included in the scenario data and the parameters of the current frame memory 8 to perform a mode determination process and thus determine the playback mode of the playback device. This determines whether the playback device is performing output in the 2D mode or the 3D mode. Once the playback mode has been determined, the current mode number, indicating the playback mode, is written to the dimension mode memory 10.

The depth value memory 12 stores depth values (one depth value for each frame from frame $F_m$ to frame $F_{m+n}$) of the frames fetched by the video decoder from the supplementary expansion data of the sequence.

The scenario memory 13 stores information read directly from the recording medium without passing through the demultiplexer 2, including stream management information, playlist information, bytecode applications, and navigation command sequences.

When a confirmation operation or a skip operation is made through the remote control using the button elements of the GUI, the UO detection module 14 outputs a user operation (UO) event indicating the operation.

When a change of playback state is caused by the current frame memory 8 or by the left-right process memory 9 of the playback state manager 7, the adjuster 15 selects a reference frame for the change in depth value from the frames before and after the point along the time axis of the video stream at which the change occurs. Then, the adjuster 15 adjusts the depth value of stereoscopic playback using the selected frame. This adjustment includes two processes, namely determining an appropriate playback position and determining an appropriate plane offset. In FIG. 5, the controller 16, the start position determiner 17, and the plane offset determiner 18 are illustrated in order to explain this process.

Upon receiving a request from outside to change the playback state, the controller 16 changes the playback state of the playback device by executing relevant processing. The playback state manager 7 manages the playback state thus changed. More specifically, the controller 16 is a microcomputer system including ROM, RAM, and a CPU. A control program for the playback device is stored in the ROM and read by the CPU. The processing pertaining to the switch request is performed through the coordination of the program and hardware resources. Switch request processing is an audiovisual playback function. Audiovisual playback functions are general functions for audiovisual playback, and include playback start, playback stop, pause, pause release, freeze-frame release, fast-forward at a speed specified by an immediate value, rewind at a speed specified by an immediate value, audio change, sub-video change, and angle change.

In the present Embodiment, a switch request may be caused by a user operation, or may be a switch instruction within scenario data. A playback state change for the playback device occurs when a switch request is made by one of the defined audiovisual playback functions. The former type of switch request is described below. A switch request caused by a user operation may be, for example, (i) a dimension change caused when the user presses the dimension change key, (ii) a scene jump caused when a user skip occurs, (iii) a chapter jump and (iv) an angle change occurring when a numerical value is directly input, and so on.

For type (i), a dimension change caused when the user presses the dimension change key, the time at which the dimension switch key is pressed is the switch request occurrence time, and the requested time, at which processing is made to begin, is the point in time following the switch request occurrence time. This is because switching the output mode is preferably done at the time following the time at which the dimension switch key is pressed. The processing corresponding to the dimension key press is a change of the number indicating the current mode, stored in the dimension mode memory 10. The current mode is then changed to 3D from 2D, or to 2D from 3D, depending on the initial mode.

The change of output mode is thus performed in response to the switch request by executing the above process.

For type (ii), a scene jump caused when a user skip occurs, the time at which the user makes the skip operation is the switch request occurrence time. The requested time, at which processing is made to begin, is then the time corresponding to the skip destination requested by the skip operation. This is because the skip operation is a request for playback to begin at the skip destination.

When the user performs a chapter skip, the current chapter number must be incremented or decremented in response to the switch request. Specifically, the current chapter number is incremented or decremented. Then, the current chapter number corresponding to the playlist mark information are stored in the current frame memory 8, along with the play item number of the play item referenced by the playlist mark corresponding to the current chapter number so incremented or decremented. Then, timestamp information indicating the requested time is written to the PTM register of the current frame memory 8, and the current frame $F_c$ is updated. Finally, the updated current frame $F_c$ is played back through random access, as instructed by the reader 1.

The above processing constitutes a scene jump in response to a switch request.

For type (iii), a chapter jump occurring when a numerical value is directly input, the switch request occurrence time is the time at which the user performs the numerical value input operation. The requested time, at which processing is made to begin, is the time of the chapter corresponding to the input numerical value. Specifically, the input numerical value is set as the current chapter number. Then, the play item number of the play item referenced by the playlist mark corresponding to the new current chapter number and the current chapter number corresponding to the playlist mark information are stored in the current frame memory 8. The above processing constitutes a scene jump in response to a switch request made by numerical input.

For type (iv), an angle change occurring when a numerical value is directly input, the switch request occurrence time is the time at which the user performs the angle switch operation. The requested time, at which processing is made to begin, is the time of the leading position of the video stream requested through the angle switch request. Specifically, the current angle number is incremented or decremented according to the angle switch operation. Then, the video stream is read in accordance with the current angle so incremented or decremented, among the stream reference information present in the play item information. The stream reference information corresponding to the current angle so incremented or decremented references the video stream corresponding to the angle number after switching. Angle switching is performed through the above processing, in response to a switch request.

The latter type of switch request is described below. The former type of switch request is executed in response to a switch request made through user operations. On the other hand, the latter type of switch request, namely switch instruction, is realized through a navigation command within the scenario data, or through bytecode corresponding to an API call. In such cases, the requested time, at which processing pertaining to the switch request is made to begin, is the playback start time designated as the destination time by the operand of the navigation command making the switch instruction, the argument of the bytecode corresponding to the API call, or similar. Here, the occurrence time for the switch request is the time at which the navigation command or bytecode making the switch instruction is read. For simplicity, the switch requests discussed in the following explanation are generally of the latter type, i.e., switch instructions.

The controller 16 includes a pre-reading controller 16a that performs pre-reading for depth value analysis. This pre-reading for depth value analysis involves reading n frames after the requested time, or p frames before the requested time and q frames after the requested time (such that n=p+q), with respect to a destination frame $F_m$ at which processing pertaining to the switch request begins. The depth values of the frames so read are demultiplexed by the video decoder and stored in the depth value memory 12. The frames read in this demultiplexing are not necessarily all played back. Only the frame selected as a reference for the depth value and frames following the selected frame are played back. That is, the n frames after the requested time, or the p frames before the requested time and the q frames after the requested time are read for depth value analysis only.

The controller also includes an interactive controller 16b, similar to the pre-reading controller 16a. The interactive controller 16b executes interactive processing that makes random access instructions to the reader 1 based on scenario data and events. Specifically, let a confirmation operation be performed on a button element highlighted within the GUI display on the display device 400, causing an event to occur. The interactive controller 16b then executes the bytecode or navigation command in the method within the button object corresponding to the button element.

The bytecode or navigation command in the method of the button element for receiving a scene jump is a switch instruction. Thus, executing the switch instruction causes the parameters specifying the current frame $F_c$ to be updated.

The start position determiner 17 determines the start position for the processing when the playback state switch request is a dimension switch request or a scene switch request.

Next, the various types of requested times are explained. The requested time for a switch request may be either fixed or variable.

A fixed requested time is, for example, the destination chapter of a scene jump or the destination angle video of an angle switch. For a BD-ROM on which a movie is recorded, chapters divisions are explicitly set by the content producer. The playback start position of each chapter is fixed at the first frame thereof. This type of instruction also includes angle switches in which playback continues seamlessly.

A variable requested time is, for example, the destination stream of a channel switch or the destination bookmark of a bookmark jump. Ideally, a bookmark jump causes playback to begin from a user-designated frame. However, given that the user does not place bookmarks on individual frames, an error tolerance of a few frames is present.

In particular, when a dimension switch request occurs, the start position determiner 17 selects a frame $F_d$ to serve as the reference for depth value adjustment. The selected frame $F_d$ is chosen from among a plurality of frames (frames $F_m$ through $F_{m+n}$) after the requested time (frame $F_k$) at which processing is to begin after the switch request, so as to minimize the depth value difference between the selected frame $F_d$ and the switch request occurrence time. The frame $F_d$ so selected is used to execute a depth value adjustment by which the start time of the switch request processing is determined. That is, the start position determiner 17 determines the reference frame by comparing the depth values of a few frames preceding and following the destination frame at the requested time to the depth value of the frame at the switch request occurrence time. The user may decide to change from 2D to 3D. As such, there is a tolerance of a few frames for the selection of start time frame $F_d$ among the range of frames spanning n frames from the destination frame $F_m$ at the requested time.

The number n of frames in the selection range for the depth value adjustment reference frame is preferably set so as to correspond to an access unit of data on the read-only medium 100. Specifically, let an access unit correspond to two or three GOPs being read out per access. Thus, n is preferably set accordingly, at 48 to 72 frames included in these access units. Alternatively, an access size may be determined according the read buffer used in each access to the read-only medium. In such a case, the selection range for the reference frame for depth value adjustment is preferably set according to the read buffer. For ease of explanation, the number n of frames in the selection range is hereinafter treated as set to an easily-handled number, such as five or six.

When a scene switch request occurs, frame $F_d$ is selected as the reference frame for depth value adjustment. Frame $F_d$ is selected from among a plurality of frames (frames $F_{m-p}$ to $F_m$) before frame $F_m$, at which processing is to begin at the requested time, and a plurality of frames (frames $F_m$ to $F_{m+q}$) after frame $F_m$, so as to minimize the depth value difference between the selected frame $F_d$ and frame $F_k$ at the scene switch request occurrence time. Frame $F_d$ so selected is used to execute a depth value adjustment by which the start time of the processing pertaining to the switch request is determined. The depth value adjustment is made by determining the processing start time and involves changing the destination frame from the frame at the requested time. When the destination frame is changed, the requested time may be advanced into the future, or may be delayed into the past. Accordingly, when the requested time is changed, the p frames preceding the requested time and the q frames following the requested time form the selection range for the reference frame for depth value adjustment. The relation n=p+q must be satisfied. Ideally, all frames in the selection range are read in a single access to the read-only medium.

The plane offset determiner 18 determines an offset reference frame $F_d$, which has a depth value serving as the offset reference for plane shifting. The offset reference frame $F_d$ is selected from among a plurality of frames (frames $F_m$ to $F_{m+n}$) preceding frame $F_m$ at which processing is to be made to begin, so as to minimize the depth value difference between the selected frame $F_d$ and the scene switch request occurrence time (frame $F_k$). Depth value adjustment is then performed using the offset reference frame so determined. The depth value adjustment by the adjuster 15 involves generating an offset in the horizontal direction for each frame of video output during an interval beginning at frame $F_k$ at the scene switch request occurrence time and the offset reference frame $F_d$. The offset so generated corresponds to the depth value of the offset reference frame $F_d$ used by the plane shift engine 5. On occasion, the requested time may be fixed. This means that the requested time is specified by the playlist mark information created during authoring. When the requested time is so fixed, stereoscopic playback begins at the depth value of the offset reference frame. While the depth of the stereoscopic video may be decreased, playback necessarily begins from the requested time of the switch request. As described above, when the requested time is fixed, care is applied by restricting the depth of the stereoscopic image so as not to harm the user's vision, although the requested time is obeyed.

This concludes the description of the constituent elements of the playback device. The following describes the details of the software processing executed by the playback device.

Figure 6:
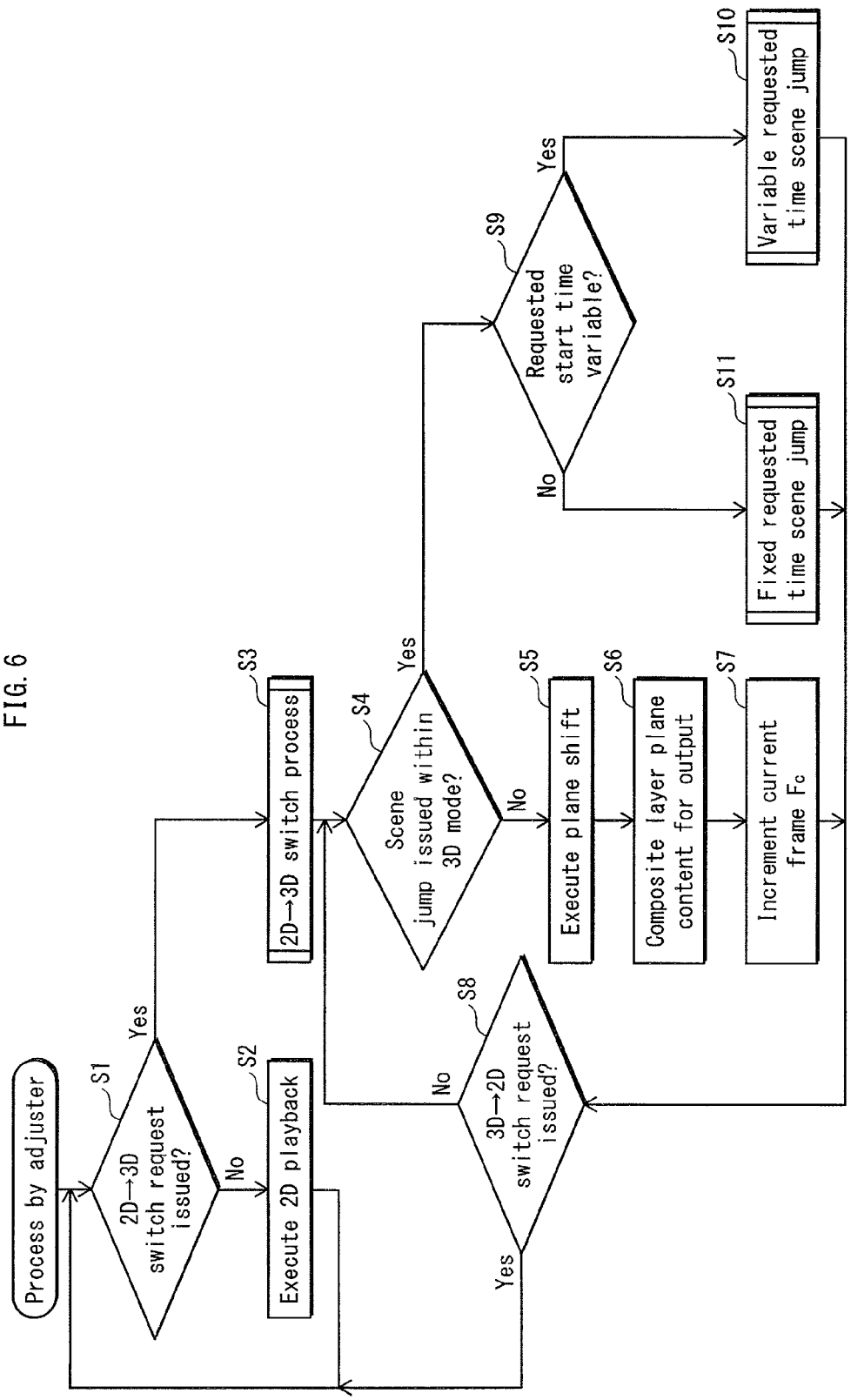
FIG. 6 is a flowchart showing the process performed by an adjuster.

FIG. 6 is a flowchart showing the process performed by the adjuster 15. Steps S1 and S2 pertain to 2D playback. In step S1, a determination is made as to whether or not a switch instruction for switching from 2D mode to 3D mode has been issued. In the negative case, 2D playback continues (step S2).

In the affirmative case, the process goes from step S1 to step S3. In step S3, the switch from 2D mode to 3D mode is executed, and the process proceeds to the determination sequence of steps S4 through S8. In step S4, a determination is made as to whether or not a 3D mode scene jump has occurred. In the negative case, a plane shift is executed (step S5), the plane content of each layer is composited (step S6), and the current frame $F_c$ is incremented (step S7). This process is repeated.

If a scene jump has occurred (Yes in step S4), then the process proceeds to step S9. In step S9, a determination is made as to whether or not the destination frame at the requested time is variable. In the affirmative case, the process proceeds to step S10, in which a scene jump to a variable requested time frame is executed. In the negative case, the process proceeds to step S11, where a scene jump to a fixed requested time frame is executed.

The process described by the above flowchart is presently described in combination with the components of the playback device. In the following explanations, the switch request of interest is a dimension switch instruction requesting a switch from 2D output video to 3D output video, or requesting a scene change from 3D output video to different 3D output video.

When a switch request occurs, the first step is to determine whether the switch request is for switching from 2D mode to 3D mode (step S1). This is done by judging whether the output video immediately preceding the switch request indicates 2D or 3D output video. This judgment is made by, for example, referencing the current mode number stored in the dimension mode memory 10.

When the dimension mode of the output video immediately preceding the switch request is the 2D mode (i.e., 2D video is displayed), another judgement is performed concerning the destination output video. This judgement is made by, for example, referencing information pertaining to the dimension mode of the destination video, or by referencing a parameter (an updated parameter for updating the current mode number in the dimension mode memory 10) included in the switch instruction for the purpose of updating the dimension mode.

Once the determination made in step S1 has established that the destination is in 3D mode, and the switch request has been judged to be a request to switch from 2D output video to 3D output video, the switch from 2D mode to 3D mode is carried out (step S3).

When a dimension switch request occurs while the current dimension mode is 2D mode, a determination is made in step S3 as to whether or not the destination mode is 3D mode. When the current mode is 2D mode, the current depth value and the destination depth value are both 0 (i.e., display occurs directly on the display screen). Thus, there is no need to perform a depth value adjustment. Therefore, steps S1 and S2 repeat in a loop, with no depth value adjustment occurring.

When a dimension switch request occurs while the current dimension mode is 3D mode, a determination is made in step S3 as to whether or not the destination mode is 2D mode. If the current dimension mode is 3D mode, then in step S8, a determination is made as to whether the destination output video is to be displayed in 2D or in 3D. This determination is made by, for example, referencing information pertaining to the dimension mode of the destination output video, or by referencing a parameter (an updated parameter for updating the current mode number in the dimension mode memory 10) included in the switch instruction for the purpose of updating the dimension mode. When the dimension mode of the destination output video is 2D mode, no depth value adjustment is performed. Thus, once the switch processing corresponding to the 2D switch request has been carried out, steps S1 and S2 repeat in a loop.

When the dimension mode of the output video is 3D mode, then in step S9, a judgement is performed regarding whether or not the destination frame may be changed (i.e., is variable).

If the judgement of step S9 is affirmative, allowing a discrepancy of a few frames, then the request is deemed to be a scene switch instruction in which a destination frame discrepancy is allowed. A variable destination frame scene jump is thus performed (step S10).

If the judgement of step S9 is negative, then the request is deemed to be a scene switch instruction in which the starting frame is fixed. A fixed destination frame scene jump is thus performed (step S11).

The judgement of step S9, i.e., whether or not the start frame for playback of the destination output video may be changed, specifically involves, for example, the switch instruction containing an indication regarding the relevant type of switch, the API call corresponding to bytecode of a certain type, or being specified by the opcode of the navigation command.

Figure 7:
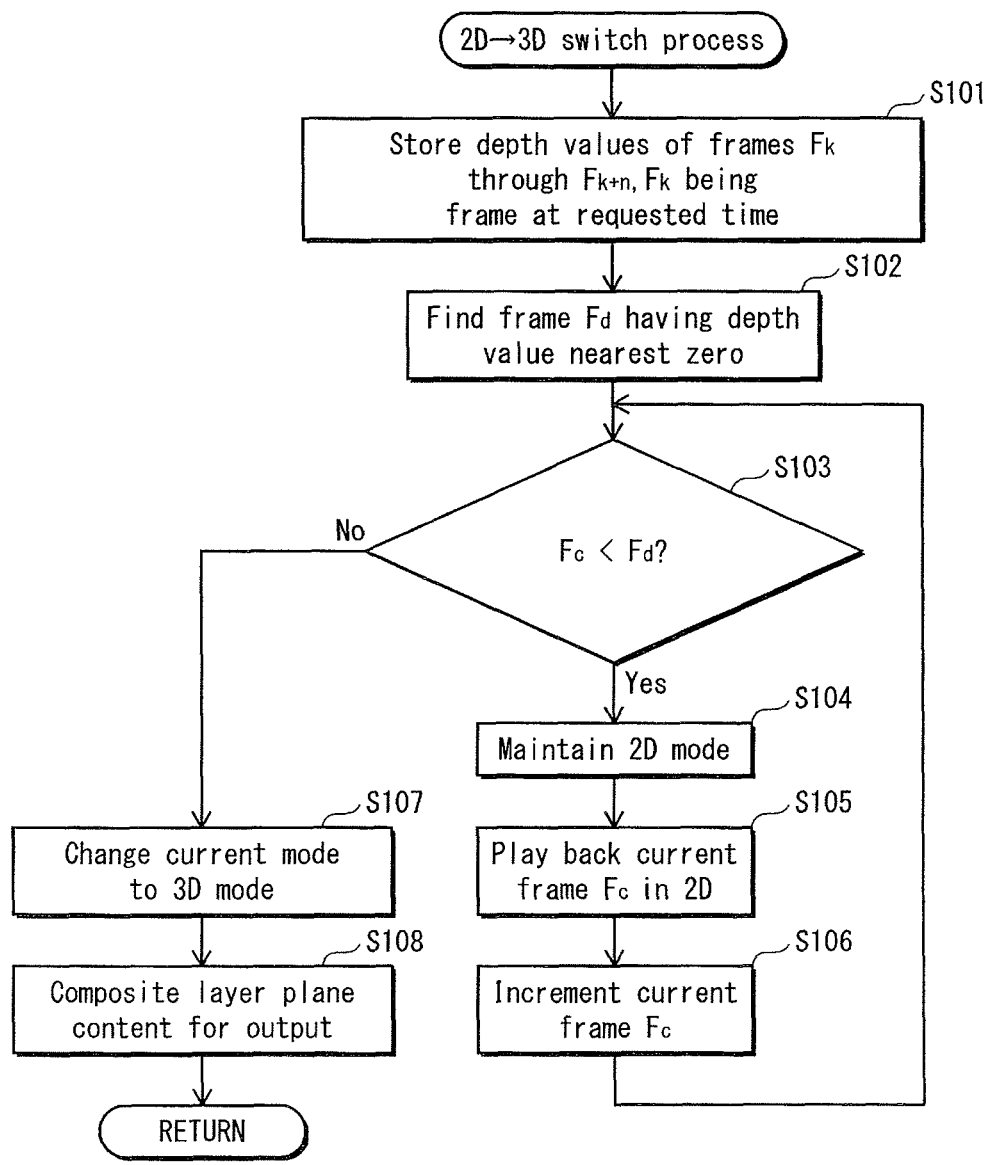
FIG. 7 is a flowchart showing the process performed for a switch instruction from 2D to 3D.

FIG. 7 is a flowchart of the dimension switch process performed for a switch request from 2D mode to 3D mode. In step S101, the depth values of a set of frames $F_k$ through $F_{k+n}$ are stored, frame $F_k$ being the frame at the requested time. In step S102, a frame $F_d$ having a depth value closest to 0 is fetched. Afterward, steps S103 through S106 are executed as a loop. In step S103, a repeat condition is set for the loop. The repeat condition is the satisfaction of the relation $F_c<F_d$, where $F_c$ is the current frame. The process is repeated as long as the relation remains satisfied. First, in step S104, 2D mode is maintained. Then, in step S105, frame $F_c$ is played back in 2D. Finally, in step S106, frame $F_c$ is incremented.

Accordingly, frame $F_c$ is played back in 2D mode until the process reaches frame $F_d$. When current frame $F_c$ becomes frame $F_d$, then the result of step S103 is No and the process advances to steps S107 and S108. In step S107, the current playback mode is changed to 3D. Then, in step S108, the plane content of each layer is composited for output.

The process described above is executed in combination with the components of the playback device. For example, let a dimension switch request occur for switching from 2D output video to 3D output video. In step S101, the depth value of frame $F_k$ that is to be output at the switch destination is stored, along with the depth values of the next n frames following frame $F_k$, in the depth value memory 12. In step S102, the start position determiner 17 retrieves frame $F_d$ from among the n frames so stored, such that the depth value of frame $F_d$ is closest to 0 (displayed nearest to the display screen). Frame $F_d$ is then frame at which the dimension switch is to occur.

While steps S103 through S106 are repeated in a loop, the demultiplexer 2, conforming to the determinations made by the dimension determiner 10, continues 2D processing until frame $F_d$ is reached (S105), and begins 3D processing after frame $F_d$ is reached (S107 and S108).

While the loop is repeating, the dimension determiner 10 determines that the output video is to be displayed in 2D until frame $F_d$ is reached, and determines that the output video is to be displayed in 3D once frame $F_d$ has been reached.

2D processing continues during steps S103 through S106. This includes, for example, displaying post-switch output video (3D output video) in 2D. Specifically, given that display of 3D output video involves using right-view and left-view video at angles sufficiently far apart to cause a parallax, either one of the right-view and left-view videos may be used to achieve 2D display. Alternatively, for systems where an offset is applied in order to distinguish the left-view and right-view for 3D display, the value of the offset may be set identically (e.g., to zero).

Figure 8A:
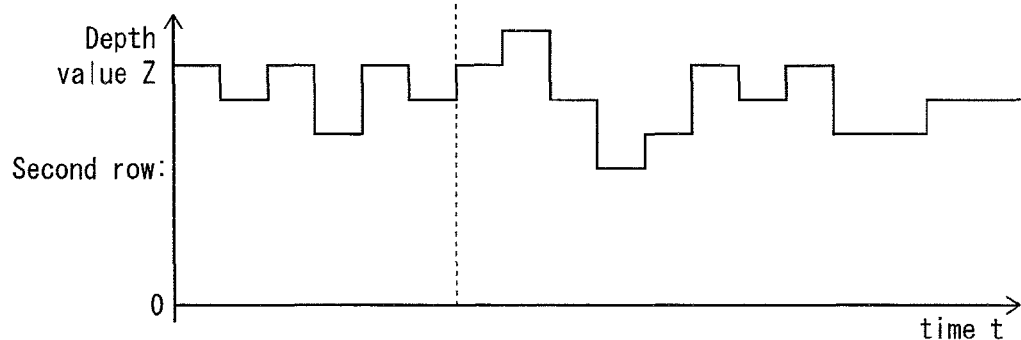
FIGS. 8A, 8B, and 8C illustrate a depth value adjustment performed when switching from 2D mode to 3D mode.

FIG. 8A illustrates a time progression of the change in depth value. In the figure, the first row indicates the frames making up the time axis of the video stream. In the second row, the time axis is shown on the lateral axis while the depth value is shown on the vertical axis.

Figure 8B:
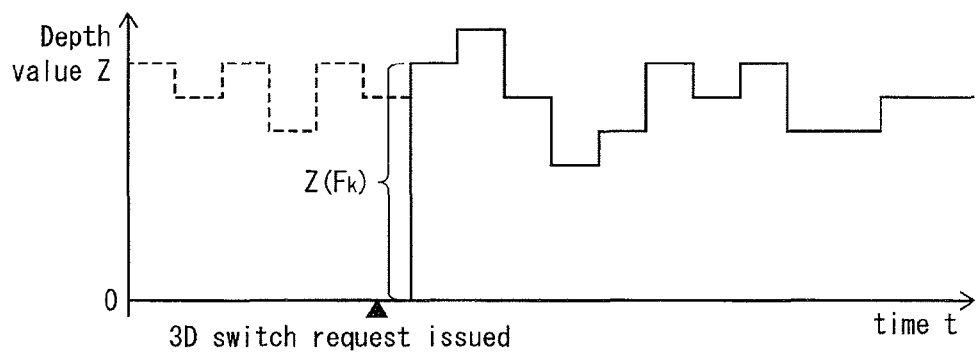

FIG. 8B shows the graph from FIG. 8A. FIG. 8B is based on FIG. 8A, differing therefrom in that the switch request occurrence time is plotted on the time axis, thus marking the switch to 3D mode.

In FIG. 8B, the request to switch to 3D occurs at frame $F_{k-1}$, and the subsequent frame $F_k$ is thus the frame at which processing for 3D display begins. As such, the depth value remains 0 during 2D display. Given that the switch to 3D display occurs at frame $F_k$ and that the depth value of frame $F_k$ is $Z(F_k)$, then the change in depth value is a change from 0 to $Z(F_k)$.

The change in depth value thus corresponds to $Z(F_k)$. If this change is large, then the viewer's eyes must perform a greater change of direction due to the new parallax degree. This may lead to ocular fatigue.

Figure 8C:
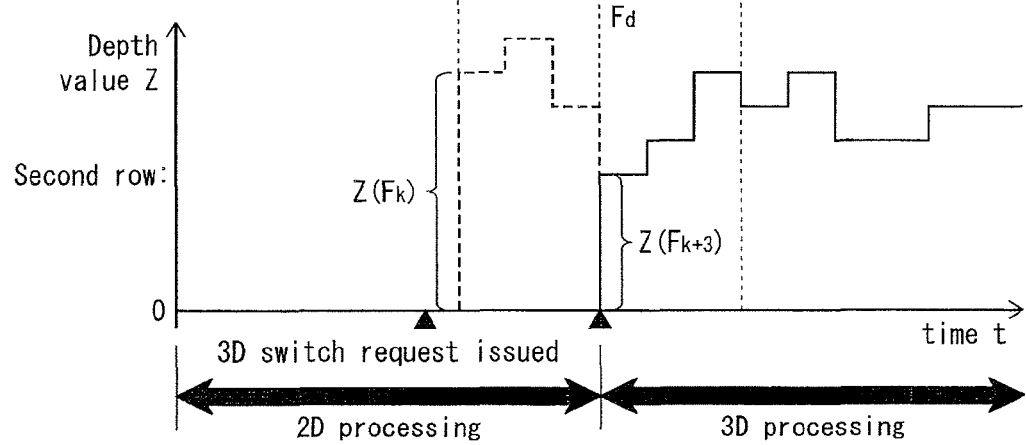

FIG. 8C indicates a reading period at the occurrence of the request to switch to 3D mode, in which frame $F_k$ serves as a reference. The reading period includes six frames, thus including the reference frame $F_k$ and five other frames (n=5). That is, the reading period extends from frame $F_k$ through frame $F_{k+5}$. The depth value memory 12 is able to store depth value information for six consecutive upcoming frames. Thus, when the switch processing begins at frame $F_{k-1}$, the depth value memory 12 stores the depth values of frames $F_k$ through $F_{k+5}$.

The second row of FIG. 8C indicates that, within the reading period, frame $F_{k+3}$ has the lowest depth value. Thus, the lowest depth value is $Z(F_{k+3})$. Accordingly, the time at which the switch to 3D mode begins is changed to frame $F_{k+3}$. Specifically, 2D mode is maintained from frame $F_{k-6}$ through frame $F_{k+2}$, while 3D mode is used as of frame $F_{k+3}$.

3D mode is initiated as of frame $F_{k+3}$, which has the lowest depth value. Accordingly, the amount of eye movement necessitated by the switch from 2D mode to 3D mode is minimized. Thus, 2D mode continues from frames $F_k$ through $F_{k+2}$. Once the relation $F_c = F_{k+3}$ is satisfied, the process switches to 3D mode. According to the above-described processing, the change in depth value produced at switch time is restricted to the difference between $Z(F_k)$ and $Z(F_{k+3})$. Therefore, the change of focal point is diminished for the viewer, thus enabling a reduction in ocular strain.

Figure 9:
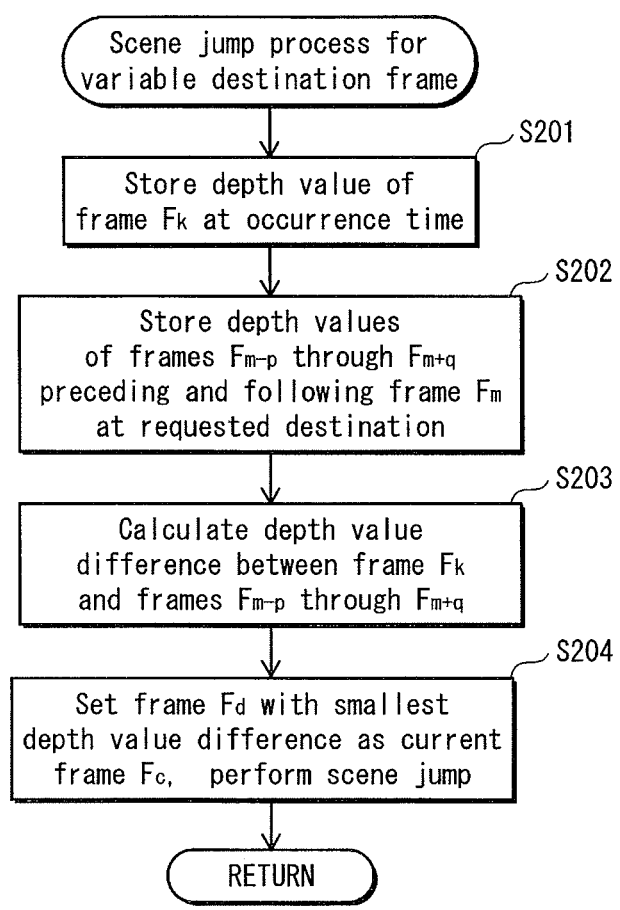
FIG. 9 is a flowchart of the process performed for a scene jump to a variable destination frame.

FIG. 9 is a flowchart of the scene jump process performed when the destination frame is variable. As indicated, the depth value of frame $F_k$ at the switch request occurrence time is stored (step S201). Then, the depth values of frames $F_{m-p}$ through $F_{m+q}$ preceding and following frame $F_m$ at the requested time are stored (step S202). Next, the difference between the depth value of frame $F_k$ and the depth values of frames $F_{m-p}$ through $F_{m+q}$ is calculated (step S203). The scene jump is then executed when frame $F_d$ for which the smallest depth value difference is calculated becomes the current frame $F_c$ (step S204).

The process of FIG. 9 is described below in connection with the components of the playback device, for a case where a request to switch between 3D scenes occurs. Once such a scene switch request occurs, the depth value memory 12 stores the depth value of frame $F_k$, which is the current frame at the request occurrence time (step S201). The depth values of n frames preceding and following the destination frame are then stored in the depth value memory (S202). The start position determiner 7 then calculates the difference (or absolute value thereof) between the depth value of each of the n frames so stored and the depth value $Z(F_k)$ of the frame $F_k$ (S203) and determines the display switch (scene switch) timing at which the difference between $Z(F_k)$ and the depth value of frame $F_d$ is minimized, notifying the controller 7 of the result. The controller 7 causes the frame $F_d$ to become the current frame, and playback begins at the frame $F_d$ (S204).

FIG. 10 illustrates the change in depth value at jump time. The first row indicates the frames ($F_{k-6}$, $F_{k-5}$, $F_{k-4}$, $F_{k-3}$ . . . $F_{k+4}$, $F_{k+5}$, $F_{k+6}$, $F_{k+7}$) forming the time axis of the video stream, before the jump. The second row shows the change in depth value over time for each frame of the first row, as a graph. The third row indicates the frames ($F_{m-6}$, $F_{m-5}$, $F_{m-4}$, $F_{m-3}$ . . . $F_{m+4}$, $F_{m+5}$, $F_{m+6}$, $F_{m+7}$) forming the time axis of the destination video stream. The fourth row shows the change in depth value over time for each frame of the third row, as a graph. With respect to the time axis shown in the first row, the jump source is frame $F_k$. The depth value of frame $F_k$ is $Z(F_k)$.

The depth value $Z(F_m)$ of the jump destination $F_m$ is plotted in the graph of the fourth row. FIG. 11A illustrates the change in depth value before and after the scene jump. The first row gives the time axis of a video stream i as overlaid with the time axis of another video stream j. Here, a jump occurs from frame $F_k$ of video stream i to frame $F_m$ of video stream j. The second row is a graph showing the change in depth value in video stream i from the first row of FIG. 10, superimposed with the change in depth value in video stream j from the fourth row of FIG. 10. There is a large difference between $Z(F_k)$ and $Z(F_m)$. Therefore, a scene jump from frame $F_k$ to frame $F_m$ causes a large change in depth, leading to ocular fatigue.

FIG. 11B illustrates the reading period used for depth value adjustment. Here, the reading period spans a three-frame range centered on frame $F_m$ at the requested time. In other words, the reading period is set to extend from frame $F_{m-3}$ through frame $F_{m+3}$. The frame in the reading period having the lowest depth value is frame $F_{m-2}$. Frame $F_{m-2}$ (highlighted) is therefore set as the adjusted frame. FIG. 11B indicates the depth values of the frames immediately preceding and following the bookmark position $F_m$ for a case where p=3 and q=3. Thus, the depth value memory 12 stores the depth values of frames $F_{m-3}$ through $F_{m+3}$.

FIG. 11C illustrates a scene jump in which the destination has been adjusted. The first row indicates that frame $F_k$ of video stream i and frame $F_{m-2}$ of video stream j are played back in succession.

Frame $F_{m-2}$ has the smallest parallax within the reading period. Thus, by adjusting the destination to frame $F_{m-2}$, the growth of the depth value is minimized.

Accordingly, the start position determiner 17 determines that frame $F_{m-2}$ is to be the jump destination and notifies the controller 7 to such effect. According to the above process, the change in depth value accompanying the bookmark jump illustrated in FIG. 11C is reduced from $|Z(F_k)-Z(F_m)|$ to $|Z(F_k)-Z(F_{m-2})|$. Therefore, ocular strain is reduced for the viewer as the change in eye direction required at jump time is made less extreme.

FIGS. 11A and 11C are used in the following contrastive explanation of the relation between the depth value and the time at which a bookmark jump occurs. Let the user have previously registered a bookmark position at frame $F_m$. In addition, let the current dimension mode before the bookmark jump be 3D mode, and let the dimension mode after the bookmark jump also be 3D mode.

FIG. 11A illustrates the change in depth value accompanying a bookmark jump as performed without the process indicated in FIG. 9. The depth value of frame $F_k$ is $Z(F_k)$, and the depth value of the bookmark position frame $F_m$ is $Z(F_m)$. Thus, the change in depth value accompanying the bookmark jump is $|Z(F_k)-Z(F_k)|$. The greater the change in depth value accompanying the bookmark jump (i.e., the value of $|Z(F_k)-Z(F_k)|$), the greater the parallax angle and the more the viewer's eyes must change orientation. This may lead to ocular fatigue for the viewer.

In contrast, as shown in FIG. 11C, the depth values of the three frames preceding and the three frames following frame $F_m$ (when p=3 and q=3 in step S202) are read and stored in the depth value memory 12. Then, in step S202, the destination frame is changed to frame $F_{m-2}$ in accordance with the depth values of frames $F_{m-3}$ through $F_{m+3}$ so stored.

The following describes the scene jump process performed when the destination frame is fixed.

Figure 12:
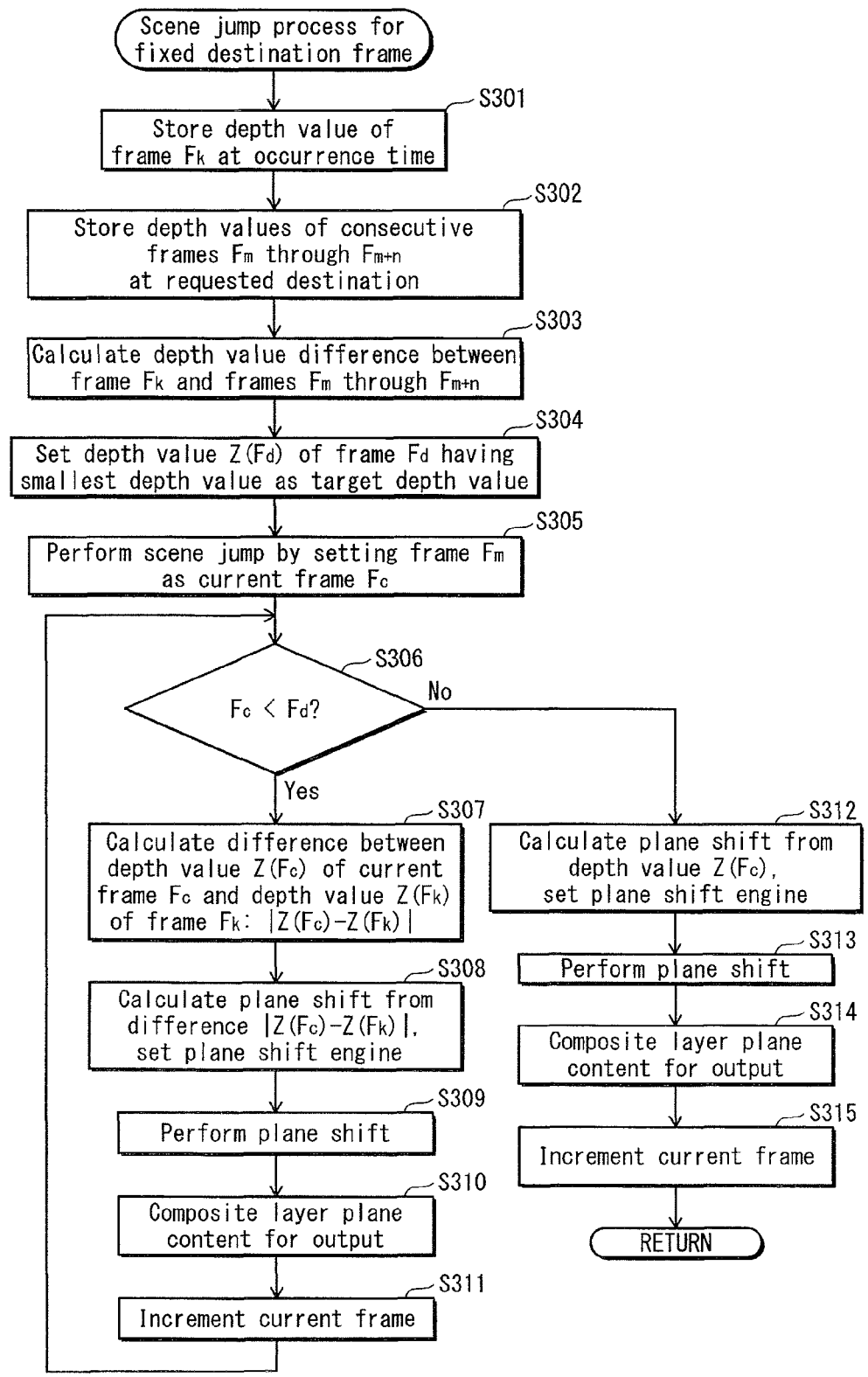
FIG. 12 is a flowchart of the process performed for a scene jump to a fixed destination frame.

FIG. 12 is a flowchart of the scene jump processing performed when the destination frame is fixed. First, the depth value of frame $F_k$, at which the switch request occurs, is stored (step S301). Then, the depth values of the frame at the requested time and of a set of subsequent frames, i.e., frames $F_m$ through $F_{m+n}$, are also stored (step S302). Next, the difference between the depth values of each frame $F_m$ through $F_{m+n}$ and the depth value $Z(F_k)$ of frame $F_k$ is calculated (step S303). The result is then used to find a frame $F_d$ having the smallest depth value $Z(F_d)$, which is made into a target depth value (step S304). The scene jump is then performed by setting frame $F_m$ as the current frame $F_c$ (step S305). Afterward, steps S306 through S311 are executed as a loop. Step 306 is an ending condition for the loop, i.e., a determination of whether or not the relation $F_c < F_d$ is satisfied. Steps S307 through S311 are repeated as long as the result of step S306 is Yes. The process involves calculating $|Z(F_c)-Z(F_k)|$, i.e., the difference between the depth value $Z(Fc)$ of the current frame Fc and the depth value $Z(F_k)$ of frame $F_k$ (step S307). This is followed by calculating a plane offset for the plane shift engine according to the difference $|Z(F_c)-Z(F_k)|$ so found (step S308) and executing a shift in the plane memory (step S309). Afterward, the plane content of each layer is composited for output (step S310) and the current frame $F_c$ is incremented (step S311). The relation $F_c < F_d$ is satisfied until frame $F_d$ becomes the current frame $F_c$. Until this takes place, the plane shift is performed based on the difference $|Z(F_c)-Z(F_k)|$.

Steps S312 through S315 are executed when the result of step S306 is No. An offset is calculated based on the depth value $Z(F_c)$, and the plane shift engine is set accordingly. The plane shift is then executed (step S312). Afterward, the plane content of each layer is composited for output (step S314) and the current frame $F_c$ is incremented (step S315).

The process described by the flowchart of FIG. 12 is presently described in combination with the components of the playback device. When a scene switch request occurs, the depth value of the frame $F_k$ at which the request occurs is stored in the depth value memory 12 (step S301). Next, the depth values of n consecutive frames, beginning with frame $F_m$, are similarly stored (step S302).

The plane offset determiner 18 calculates the difference (or the absolute value thereof) between the depth value $Z(F_k)$ of frame $F_k$ and each of the n depth values stored in the depth value memory 12 (step S303). The depth value $Z(F_d)$ of a frame $F_d$ having the smallest result is then set as the target depth value (step S304). The controller 16 changes the playback position to the destination frame $F_m$ (step S305). The demultiplexer 2 begins 3D processing at frame $F_m$.

The plane offset determiner 18 calculates a plane offset allowing the depth value of the current frame to remain at the target depth value $Z(F_d)$ until the process has progressed from frame $F_m$ to frame $F_d$ (step S307). The plane shift engine 5 then updates the plane offset (step S308). The plane shift engine 5 uses the information stored in the left-right process memory 9 to verify whether the video plane currently undergoing processing is the left-view plane or the right-view plane, and performs a shift toward a set direction (step S309). When frame $F_d$ becomes the current frame, the plane offset determiner 18 calculates and updates a plane offset according to the depth value of the frame currently being processed by the plane shift engine 5.

FIGS. 13A, 13B, and 13C illustrate the depth value adjustment made through designated value control. The first row of FIG. 13A illustrates a jump from video stream i to video stream j. Here, the jump begins at frame $F_k$ and the jump destination is frame $F_m$. Playback thus proceeds from frame $F_k$ directly to frame $F_m$. The second row illustrates the change in depth value in video stream j. $Z(F_k)$ is low while $Z(F_m)$ is high. Thus, the change in depth is extreme.

FIG. 13A clearly illustrates the relation between the depth value and the time at which a chapter jump is performed. Let the user select a chapter that begins at frame $F_m$ during the playback of frame $F_k$. Performing a chapter jump using the same process as that described in FIG. 9 for 2D playback leads to a great depth value difference $|Z(F_k)-Z(F_m)|$.

FIG. 13B indicates the reading period used when the destination is $F_m$. The first row shows that frames $F_m$ through $F_{m+6}$ are read. Frame $F_{m+5}$ (highlighted) has the lowest depth value. The second row illustrates the depth value of each frame in the reading period. Given that the depth value of frame $F_{m+5}$ is the lowest, this value is used as the target value for offset control.

FIG. 13B illustrates the depth values of a set of consecutive frames beginning at the frame $F_m$ where the chapter jump is initiated. When the scene switch instruction corresponding to this scene switch request is received, the depth value memory 12 stores the depth value of the current frame $F_k$ (i.e., the current frame before the switch). Suppose that the depth values of six consecutive frames, beginning with jump destination frame $F_m$, are also stored (i.e., that n=6). The depth value memory 12 thus stores the depth value of frame $F_m$ through frame $F_{m+6}$.

Once the difference between the depth value $Z(F_k)$ of frame $F_k$ and the depth value of each frame $F_m$ through $F_{m+6}$ has been calculated, frame $F_{m+5}$ is found to have the smallest such difference (or absolute value). Thus, the plane offset determiner 18 determines that the depth value $Z(F_{m+5})$ of frame $F_{m+5}$ is the target depth value.

FIG. 13C illustrates the depth value adjustment made through plane shift control. The second row is a graph illustrating the plane shift control. The dashed outline indicates a depth value change without plane shift control. The change in depth value is identical to that of FIG. 13A. The solid line indicates the selective change in depth value obtained through plane shift control. The plane shift control is performed so as to maintain the depth value of frames $F_m$ through $F_{m+5}$ of video stream j at $Z(F_d)$. Thus, no extreme change in depth occurs.

The controller 16 changes the playback position to frame $F_m$ and begins playback. Until frame $F_{m+5}$ becomes the current frame, i.e., for frames $F_m$ through $F_{m+4}$, the plane offset determiner 18 determines the difference between the target depth value $Z(F_{m+5})$ and the depth value $Z(F_{m+i})$ (where i=0, 1, 2, 3, 4) of the frame undergoing processing as being the plane offset of the plane shift engine 4.

The plane shift engine 5 shifts the video plane as required to make the depth value of the current frame equal to the target depth value $Z(F_{m+5})$.

As shown in FIG. 13C, the depth value of the output frame is maintained at $Z(F_{m+5})$ until frame $F_{m+5}$ is reached. This decreases the change in depth value occurring at chapter jump time from $|Z(F_k)-Z(F_m)|$ to $|Z(F_k)-Z(F_{m+5})|$. Once frame $F_{m+5}$ is reached, the plane offset determiner 18 performs shift processing corresponding to the depth value of the frames in accordance with the setting of the plane shift engine 5. Accordingly, there is no need for the viewer's eyes to perform an extreme angle change at switch time, which in turn reduces ocular fatigue.

Figure 14:
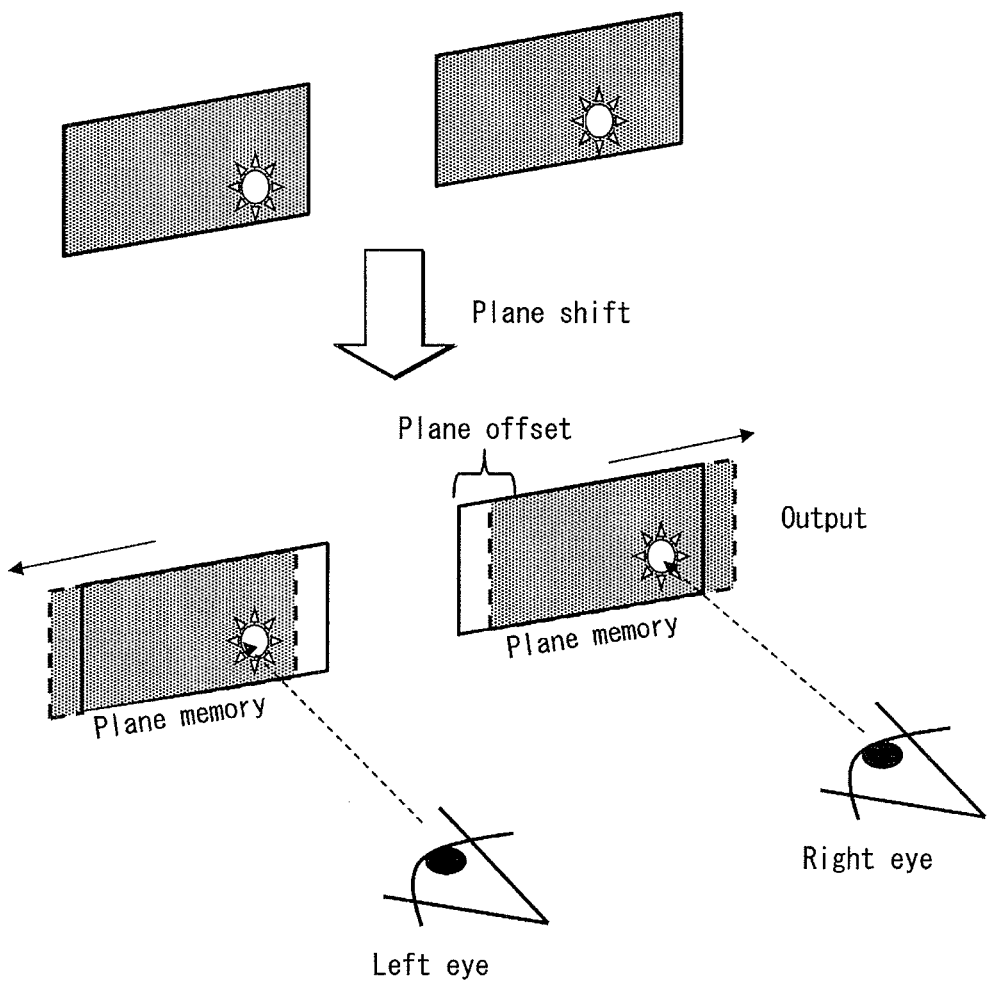
FIG. 14 illustrates an example of plane shift processing using an offset.

An example of the video plane shifting process is explained with reference to FIGS. 14 and 15. FIG. 14 illustrates an example of a process using offset processing.

Let the plane shift engine 5 be set to an offset of one. The right-view video plane and the left-view video plane are each shifted by one pixel in the directions of the respective arrows on FIG. 14. When the offset has a negative value, the shift occurs in directions opposite to the arrows on FIG. 14. The image appears farther away when the offset is positive, and appears nearer when the offset is negative.

Figure 15:
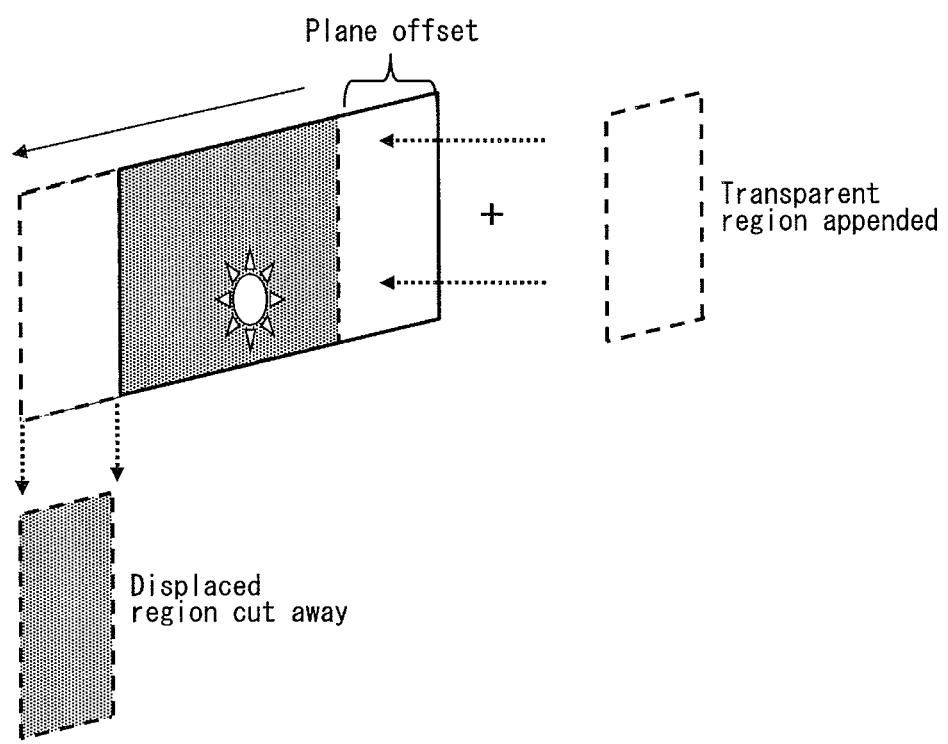
FIG. 15 illustrates an example of shifting a right-view video plane by a positive value of x.

FIG. 15 illustrates an example of a shift of value x being applied to the left-view video plane. First, an area having the width of video plane offset x and the height of one video plane is cut from the leftmost edge of the video plane. Second, the video plane is shifted horizontally to the left by the video plane offset value. Third, a transparent area having the width of video plane offset x and the height of one video plane is appended to the rightmost edge of the video plane.

[Embodiment 2]

Figure 16:
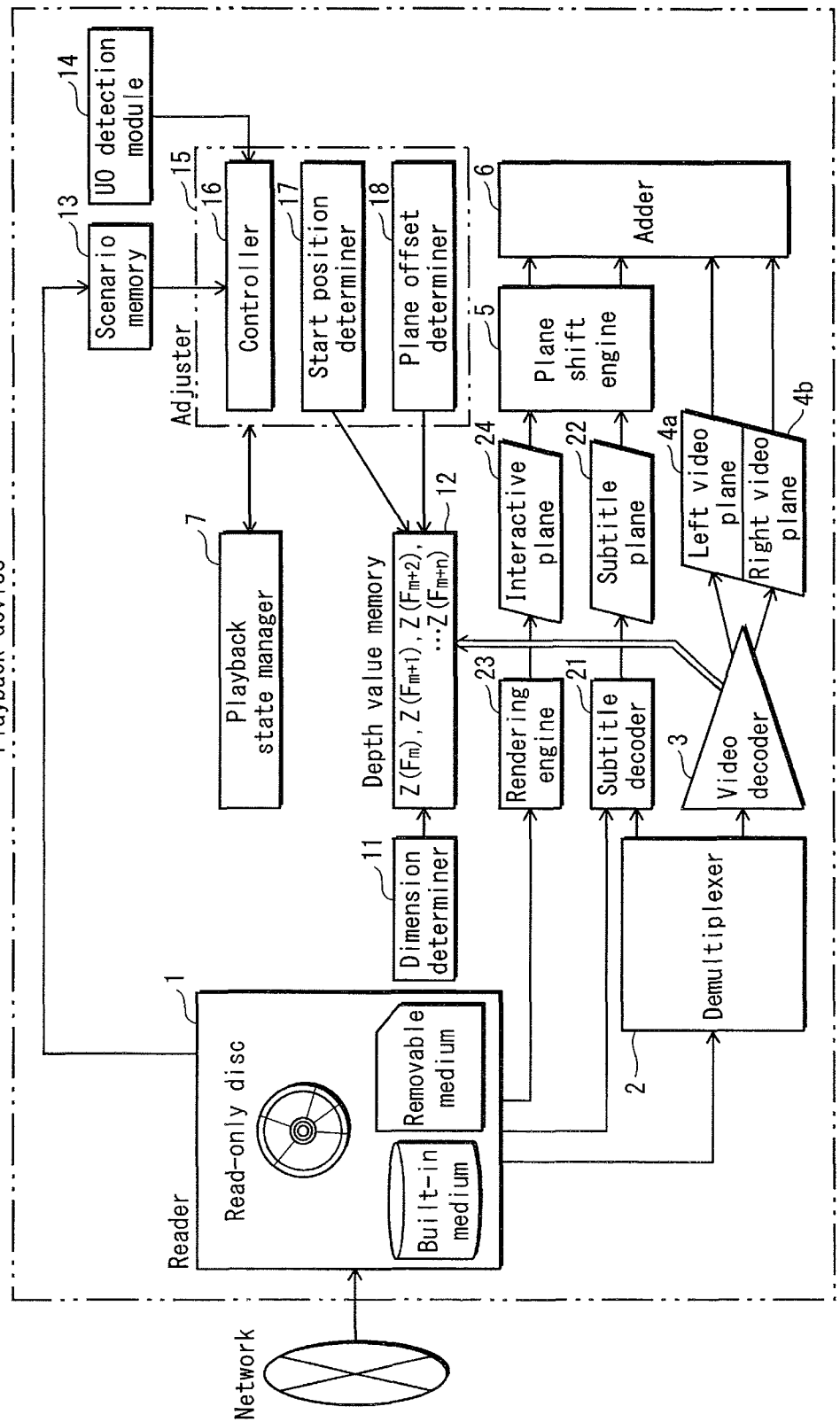
FIG. 16 is a diagram showing the internal configuration of the playback device pertaining to Embodiment 2.

While Embodiment 1 performs a plane shift on the video plane 4, the present Embodiment presents an improvement in which a plane shift is applied to the graphics plane. FIG. 16 is a diagram showing the internal configuration of the playback device pertaining to Embodiment 2. FIG. 16 greatly resembles FIG. 5, differing in that the video plane 4 is replaced by left-view and right-view video planes 4a and 4b, and in the addition of a subtitle decoder 21, a subtitle plane 22, a rendering engine 23, and an interactive plane 24.

The right-view video plane 4a stores pixel data making up the right-view video obtained by the video decoder.

The left-view video plane 4b stores pixel data making up the left-view video obtained by the video decoder.

The subtitle decoder 21 decodes the subtitle graphics stream demultiplexed by the demultiplexer 2, the text subtitle stream read directly by the reader 1 without passing through the demultiplexer 2, and so on. The subtitle decoder 21 then writes uncompressed graphics to the subtitle plane 22.

The subtitle plane 22 stores one screen of pixel data making up subtitle graphics decoded by the subtitle decoder 21.

The rendering engine 23 decodes image data recorded on the recording medium in JPEG, PNG, or ZIFF format and writes the images thus obtained to the interactive plane 24 in accordance with instructions from the controller 16.

The interactive plane 24 is memory for storing one screen of images. The images so stored are bitmaps in ARGB format.

This concludes the explanation of the additional components of Embodiment 2. The following describes the improved components of Embodiment 2 in detail.

The improved plane shift engine 5 of Embodiment 2 performs a plane shift on the subtitle plane 22 and on the interactive plane 24. The plane shift enables stereoscopic viewing of the subtitle plane 22 and the interactive plane 24 despite the use of a single-plane configuration therefor. The plane shift is performed using depth values stored in the depth value memory 12.

The improved adder 6 of Embodiment 2 adds the pixel data of the interactive plane 24, the subtitle plane 22, and of the right-view video plane 4a and left-view video plane 4b such that the data are viewed in the stated order. The plane memory layers are thus composited.

The improved controller 16 of Embodiment 2 selects a frame in which the depth values of the interactive plane 24 and the subtitle plane 22 are minimal and uses that frame as a reference for performing depth value adjustment.

According to the above-described Embodiment, the depth value used for plane shifting the subtitle plane 22 and the interactive plane 24 is read from the depth value memory 12 and the frame offset is determined such that the frame position reduces the depth value. Thus, the effect on the user is minimized.

(Supplement)

The present invention has been described above according to the most preferable Embodiments known to the inventors at publication time. However, further technological improvements are possible, such as the following. The choice of whether or not to implement the following improvements and variations is left to the best judgement of those using the Embodiments.

(Depth Value Control Content Range)

In Embodiment 1, the content subject to depth value control is a movie made up of digital streams and playlist information. However, the content may instead be a game application made up of polygon or polyhedron models. For a game, depth value adjustment may be performed such that changes to characters defined by polygon or polyhedron models, or to levels of the game, are portrayed by the playback device.

(Recording Medium Variations)

In the Embodiments, the content subject to depth value control is recorded on a read-only medium and played back for viewing. However, the content may also be provided by wireless transmission, such as broadcast waves, by wired transmission through a cable, or through another type of recording medium (e.g., a magnetic recording medium such as a hard disk, flash memory, or semiconductor memory such as an SD card). In particular, content may be obtained from a network drive, i.e., from a recording medium on a network. The network drive is made accessible by a client program or by a server program executing a file transfer protocol through the protocol stack. The playback device then performs processing as a client program. Thus, the recording medium on the network may provide digital streams and scenario data as described in Embodiment 1.

When content is obtained from a broadcast medium, wired or wireless, the broadcaster uses an archive program to archive the directory file structure of the recording medium file system, and then repeatedly broadcasts the archive file so obtained in an object carousel format. The playback device then receives the archive file and expands the directory file structure stored in the received archive file into a device cache. The playback device is then able to access the directory and file structure as a local recording medium. Accordingly, digital streams and scenario data are provided to the playback device as described in Embodiment 1.

(Stereoscopic View Variations)

The above Embodiments describe a stereoscopic viewing method involving shutter glasses 500. However, other methods for displaying left-view and right-view video to each of the left and right eye may also be used. For example, the display may use the Side-by-Side format or a lenticular lens, and may or may not make use specialized viewing gear such as glasses.

(Depth Value Adjustment for Skips)

The Embodiments describe content recorded on a read-only medium being played back for viewing. However, when a home video produced by the user is being played back, large changes in depth value occur much more frequently. In the particular case of a playback-only medium such as a BD-ROM, the creator has taken the viewer's eyes into consideration when editing the picture, defining chapters, and so on. However, in the case of home video, the user capturing and editing the footage is unlikely to take depth value changes into consideration. Under such circumstances, chapter jumps may be interpreted as scene switch instructions.

(Video Decoder Expansion)

The configuration shown in FIG. 5 includes one video decoder and one video plane. However, video data and a video plane for processing the left-view video and right-view video may be provided separately, with processing being performed in parallel for acceleration purposes.

(Switch Start Frame Selection)

The Embodiments describe variable destination frame scene jumps as being performed by selecting the initial frame for playback at the jump destination from among the frame at the requested time and the next n consecutive frames, according to the depth values thereof. However, the frame at the requested time and the next m consecutive frames may be used instead.

(Offset Adjustment Variations)

The Embodiments describe fixed destination frame scene jumps as being performed through a plane offset that is maintained at the target depth value $Z(F_d)$ of a selected frame until the selected frame is reached. Naturally, the offset may be gradually adjusted so as to approach the target depth value $Z(F_d)$ by the time frame $F_d$ is reached.

In Embodiment 1, 2D processing continues from the reception of a dimension switch request until selected frame $F_d$ is reached. However, the plane offset determiner may be used to shift the video plane so as to gradually adjust the depth value until that of frame $F_d$ is achieved. Specifically, the plane shift engine 5 takes the depth value $Z(F_c)$ of the current frame $F_c$ before the switch to 3D mode as an initial value, and takes the depth value $Z(F_d)$ of the offset reference frame $F_d$ as a target value. The plane shift engine 5 then gradually changes the offset used for plane shifting. This gradual change is performed by taking the number of frames separating the offset reference frame $F_d$ from the current frame Fc, and then dividing the depth value difference $|Z(F_d)-Z(F_c)|$ by the number of frames so found. Thus, the appropriate offset for each frame is obtained. The offset applied to each frame grows gradually between the offset reference frame $F_d$ and the current frame $F_c$. Thus, monotonic depth value variation is realized.

(Destination Frame Selection Variations)

The Embodiments describe the process for all types of switch instructions using an example where a frame is selected from among a set of frames that includes the destination frame, such that the depth value change from the occurrence is minimized, and processing for 3D display begins once the selected frame is reached or, alternatively, the depth value of the selected frame is maintained until the selected frame is reached. However, a maximum value $Z_{max}$ for the depth value change may be designated and the selected frame may be selected so as to have the lowest depth value relative to $Z_{max}$, or weighting may be used to prioritize frames closest to the destination frame.

(Depth Value Acquisition Variations)

The depth value of each frame may be acquired from scenario data stored by the scenario memory. The scenario data includes playlist information. The pieces of play item information making up the playlist information include a basic stream selection table, while the playlist information itself includes an expanded stream selection table. The basic stream selection table is a list of element streams played back in planar mode, each associated with a stream number.

The expanded stream selection table is a list of element streams played back in 3D mode, each associated with a stream number having the same stream number. The expanded stream selection table has control information associated with each stream number. In 3D mode, left-view and right-view video are used together for stereoscopic playback in main-sub mode. Alternatively, the left-view video may be used alone for planar playback in main-main mode. The control information in the aforementioned expanded stream selection table includes the offset that is to be used for plane shifting the graphics plane when a pop-up menu is displayed or when the main-main playback mode is used for 3D mode. This offset indicates the parallax between the left-view and right-view video. Given that this parallax changes for each piece of play item information, the offset may be stored as a depth value in the depth value memory 12 and used for depth value adjustment to ensure that the depth value does not become overly high.

Also, the depth value of each plane may be included in a transport stream, or may be calculated and extracted from input stereoscopic images.

(Video Stream Supply Variations)

The Embodiments describe playing back content recorded on a read-only medium for viewing. However, the playback device may include communication means for downloading content via a network and memory, such as a hard disk, for storing data so downloaded. The Embodiments may also be applied to such a playback device.

Also, the playback device may include reception means, such a tuner, for receiving broadcast waves. When data corresponding to the content recorded on the read-only medium is received, the Embodiments may be applied to channel switching and the like.

(Integrated Circuit)

The hardware components of the playback device described in Embodiment 1, including logic and memory components, i.e., components central to the logic circuits, but excluding functional members such as the recording medium drive, the external connectors and so on, may be integrated as a system LSI. A system LSI is a bare chip implemented on a high-density substrate for packaging. System LSIs also include multi-chip modules, in which a plurality of such chips are included in an LSI-like structure.

Key types of packages for the system LSI include QFP (Quad Flat Package) and PGA (Pin Grid Array). QFP is a type of system LSI in which pins are attached to a quadrilateral package. PGA is a type of system LSI in which multiple pins are attached to the entirety of an undersurface.

The pins include power supply and ground pins, as well as pins serving as interfaces with other circuits. As such, the pins of a system LSI allow the system LSI to play a central role in the playback device through this connection to other circuits.

Figure 17:
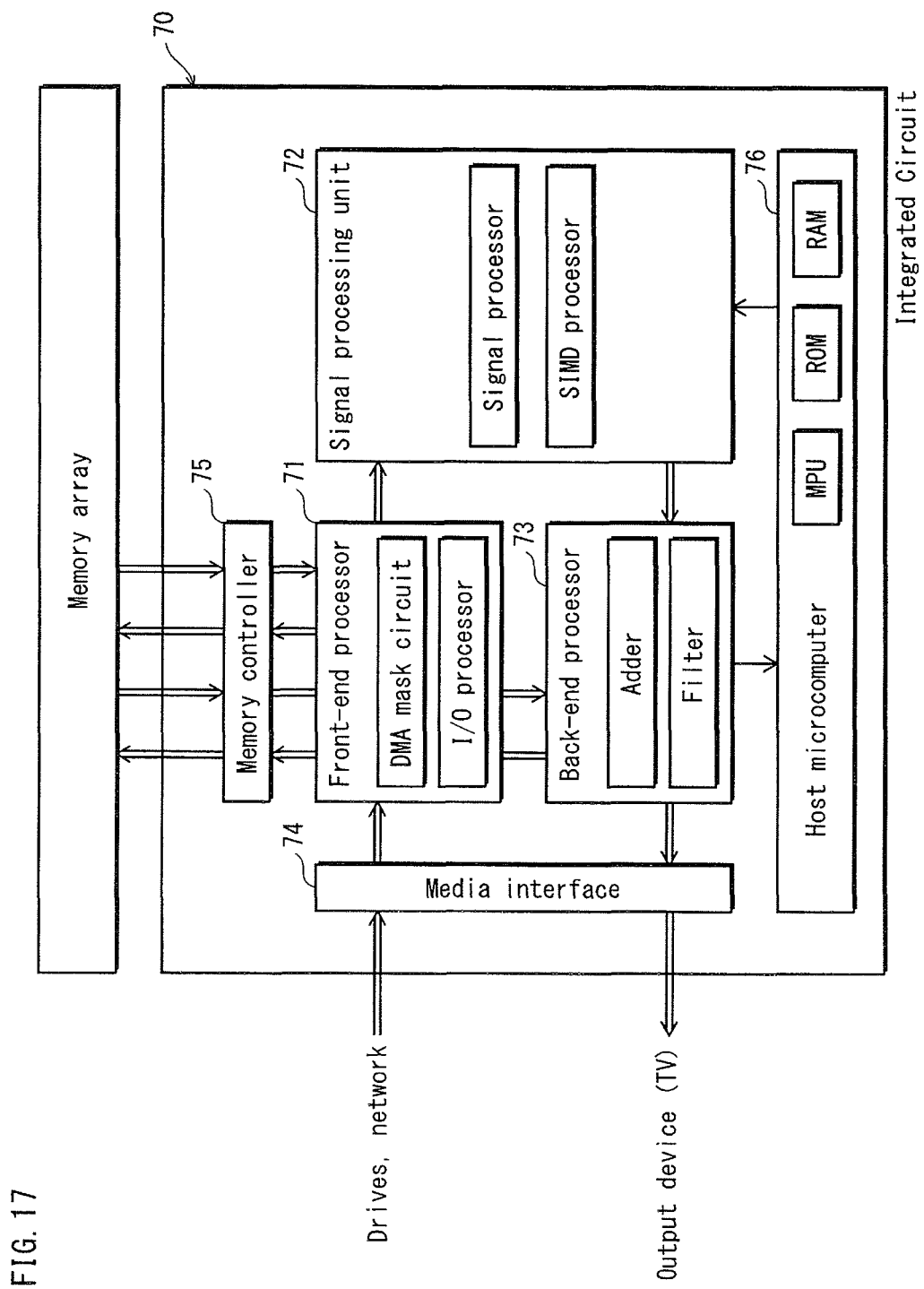
FIG. 17 illustrates the architecture of an integrated circuit.

FIG. 17 illustrates the architecture of an integrated circuit. As shown, the architecture of the integrated circuit 70 includes a front-end processor 71, a signal processing unit 72, a back-end processor 73, a media interface 74, a memory controller 75, and a host microcomputer 76. The media interface 74 and the memory controller 75 connect to the drives, memory, and communications units of the playback device. The drives of the playback device may include the read-only medium drive, a local storage drive, a removable media drive, and so on.

The front-end processor 71 includes a pre-programmed DMA mask circuit, an I/O processor and the like, and executes general packet processing. Packet processing corresponds to the processing performed by the demultiplexer. Packet processing is executed through DMA transfer between the read buffer, the plane memory, and the various other buffers included in the playback device memory.

The signal processing unit 72 may include a signal processor, an SIMD processor or similar, and executes general signal processing. The signal processing unit handles the decoding of the video decoder and the audio decoder.

The back-end processor 73 includes the adder and filters, and performs general audiovisual output processing. Audiovisual output processing includes pixel superposition, resizing, and image format conversions used for compositing the layers. Digital-to-analogue conversions are also executed, simultaneously.

The media interface 74 is the interface with the drives and the network.

The memory controller 75 is a slave circuit for memory access that reads the packet and picture data memory in response to requests from the front-end processor, the signal processing unit, and the back-end processor. The read buffer and the various buffers of the video plane, the graphics plane, and the video decoder are read and written to by the memory controller 75.

The host microcomputer 76 corresponds to the components of the adjuster 15 shown in FIG. 5, includes an MPU, ROM, and RAM, and executes overall control of the media interface, the front-end processor, the signal processing unit, and the back-end processor. This includes control of the controller 16, the start position determiner 17, and the plane offset determiner 18 making up the adjuster 15. The CPU of the host microcomputer includes an instruction fetcher, a decoder, an execution unit, register files, and a program counter. A program executing the functions of the above-described Embodiments may be stored in the ROM of the host microcomputer as an embedded program, along with the BIOS (Basic Input/Output System) and various types of middleware (the operating system). The principal functions of the playback device are thus realizable by the system LSI.

(Program)

A program representing the Embodiments may be created as follows. First, a software developer uses a programming language to write a source program realizing the flowcharts and functional components. The developer follows the syntax of the programming language, using class structures, variables, array variables, and calls to external functions for this purpose.

The source program so written is then passed to a compiler as a file. The compiler translates the source program to generate an object program.

This involves syntactical analysis, optimization, resource allocation, and code generation. Syntactical analysis is the process of analyzing the text of the source program to perform syntactic and semantic analysis, thereby converting the source program into an intermediate program. Optimization is the process of splitting the intermediate program into basic bocks, performing control flow analysis, and performing data flow analysis. Resource allocation is the process of allocating the registers or memory of the target processor so that the instruction set is measured appropriately. Code generation is the process of converting the intermediate instructions in the intermediate program into program code, thereby obtaining the object program.

The object program so generated is made of one or more pieces of program code executed by a computer to realize the steps shown in the flowcharts and to realize the functional components of the above Embodiments. The program code may be the processor's native core, Java™ bytecode, or similar. The program code is executed in various ways in order to perform the steps. External functions may be used to execute the steps. In such cases, a call statement is placed in the program code to call the external function. The program code used to execute each step may belong to different individual object programs. For a RISC processor, in which the instruction types are limited, arithmetic operation instructions, logical operation instructions, branch instructions and the like may be combined to realize the steps shown in the flowcharts.

Once the object program has been generated, the program initializes a linker. The linker allocates memory space for the object program and related library programs, combining all into a single whole to generate a load module. The load module so generated is read by a computer. Thus, the computer is made to execute the process indicated by the flowcharts and the functions described in the Embodiments. The computer program may be provided to the user as recorded on a recording medium so as to be non-transitorily read by the computer.

[Industrial Applicability]

The present invention pertains to technology for reducing dramatic changes to the depth of output video in a playback device able to play back both planar and stereoscopic video. The present invention is particularly applicable to such playback devices having a function for switching from planar to stereoscopic video, or for making scene jumps while playing back stereoscopic video.

[Reference Signs List]

2 Demultiplexer
3 Video decoder
4 Video plane
5 Plane shift engine
9 Left-right process memory
11 Dimension determiner
12 Depth value memory
17 Start position determiner
18 Plane offset determiner
100 Read-only medium
200 Playback device
300 Remote control
400 Display
500 Shutter glasses

The invention claimed is:

1. A playback device for outputting 3D video for stereoscopic viewing, comprising:
   an acquisition unit acquiring a video stream from an external source;
   a playback unit decoding the video stream so acquired to output 3D video;
   a state management unit managing a playback state of the playback unit; and
   an adjustment unit performing adjustment, when a change of playback state occurs, by (i) selecting a depth value reference frame from among a plurality of frames preceding and following a frame at an occurrence time of the change, and (ii) using the depth value reference frame to adjust a depth value of 3D video.

2. The playback device of claim 1, wherein
the adjustment unit includes a control unit,
the control unit receives a switch request from an external source for switching the playback state and executes corresponding switch processing, and
the depth value reference frame is selected by:
   comparing a parallax value of each of a set of frames to a parallax value of a frame at an occurrence time of the switch request, the set of frames being frames preceding or following, or frames both preceding and following a requested time for initiating the switch processing; and
   selecting one frame among the set of frames according to comparison results.

3. The playback device of claim 2, further comprising:
a start position determiner and a parallax value memory storing a plurality of parallax values, wherein
at the occurrence time of the switch request, the acquisition unit stores, in the parallax value memory, the parallax value of each of the set of frames,
the start position determiner determines one frame to be selected as the depth value reference frame, and
the frame determined by the start position determiner has the smallest parallax value stored in the parallax value memory among the set of frames.

4. The playback device of claim 2, wherein
the adjustment unit includes a start position determiner,
the start position determiner determines a start time at a frame for initiating the switch processing, and
the adjustment is performed by setting a playback time of the depth value reference frame as the start time for initiating switch processing.

5. The playback device of claim 4, wherein
the switch request is a dimension switch request for switching from a two-dimensional mode to a three-dimensional mode, and
the depth value reference frame is a frame least different in depth value from a frame at the occurrence time of the dimension switch request, among the frames following the requested time for initiating the corresponding dimension switch processing.

6. The playback device of claim 4, wherein
the switch request is a scene switch request for switching from one scene of the 3D video to another scene of the 3D video, and
the depth value reference frame is a frame least different in depth value from a frame at the occurrence time of the scene switch request, among the frames following and preceding the requested time for initiating the corresponding scene switch processing.

7. The playback device of claim 2, wherein
the playback unit includes:
   a plane memory storing pixel data for one screen; and
   a shift engine executing a plane shift on each coordinate of the pixel data stored in the plane memory by applying a horizontal shift of a predetermined offset,
the 3D video is made up of (i) right-view pictures obtained through a rightward shift of each coordinate of the pixel data stored in the plane memory, and (ii) left-view pictures obtained through a leftward shift of each coordinate of the pixel data stored in the plane memory,
the switch request is a scene switch request for switching from one scene of the 3D video to another scene of the 3D video,
the depth value reference frame is an offset reference frame, and the parallax value thereof serves as an offset reference for the plane shift, and
the offset reference frame is a frame least different in depth value from a frame at the occurrence time of the scene switch request, among the frames following the requested time for initiating the corresponding scene switch processing.

8. The playback device of claim 7, wherein
the adjustment by the adjustment unit is performed by applying an offset corresponding to the parallax value of the offset reference frame as the horizontal shift of the predetermined offset within a period beginning with the frame at the requested time for initiating scene switch processing and ending at the offset reference frame.

9. The playback device of claim 8, wherein
the shift engine takes the parallax value of a frame preceding the switching to a three-dimensional mode as an initial value, takes the parallax value of the offset reference frame as a target value, and gradually changes the offset of the plane shift applied to each frame of the 3D video.

10. An integrated circuit for integration into a playback device for outputting 3D video for stereoscopic viewing, comprising:
   an acquisition unit acquiring a video stream from an external source;
   a playback unit decoding the video stream so acquired to output 3D video;
   a state management unit managing a playback state of the playback unit; and
   an adjustment unit performing adjustment, when a change of playback state occurs, by (i) selecting a depth value reference frame from among a plurality of frames preceding and following a frame at an occurrence time of the change, and (ii) using the depth value reference frame to adjust a depth value of 3D video.

11. A computer-readable non-transitory recording medium on which a program for causing a computer to output 3D video for stereoscopic viewing is recorded, the program causing the computer to execute:
   acquiring a video stream from an external source;
   decoding the video stream so acquired to output 3D video;
   managing a playback state of the playback unit; and
   performing adjustment, when a change of playback state occurs, by (i) selecting a depth value reference frame from among a plurality of frames preceding and following a frame at an occurrence time of the change, and (ii) using the depth value reference frame to adjust a depth value of 3D video.

* * * * *